(12) United States Patent
Li et al.

(10) Patent No.: US 12,228,462 B1
(45) Date of Patent: Feb. 18, 2025

(54) ANTHROPOGENIC HEAT FLUX ESTIMATION METHOD AND SYSTEM BASED ON FLUX OBSERVATION DATA

(71) Applicant: South China University of Technology, Guangdong (CN)

(72) Inventors: Qiong Li, Guangdong (CN); Huiwang Peng, Guangdong (CN); Qinglin Meng, Guangdong (CN); Qi Li, Guangdong (CN); Qinrong Yang, Guangdong (CN); Shuo Jiang, Guangdong (CN)

(73) Assignee: South China University of Technology, Guangdong (CN)

( * ) Notice: Subject to any disclaimer, the term of this patent is extended or adjusted under 35 U.S.C. 154(b) by 0 days.

(21) Appl. No.: 18/788,239

(22) Filed: Jul. 30, 2024

(51) Int. Cl.
*G01K 7/42* (2006.01)
(52) U.S. Cl.
CPC .................................. *G01K 7/427* (2013.01)
(58) Field of Classification Search
None
See application file for complete search history.

(56) References Cited

U.S. PATENT DOCUMENTS

| | | | | |
|---|---|---|---|---|
| 2011/0054803 A1* | 3/2011 | Burba | ............... | G01N 21/3504 702/23 |
| 2011/0270534 A1* | 11/2011 | Burba | ............... | G01N 21/3504 702/24 |
| 2023/0129704 A1* | 4/2023 | Zhou | ................ | G01W 1/10 702/3 |

FOREIGN PATENT DOCUMENTS

| | | | | |
|---|---|---|---|---|
| CN | 112287296 A | * | 1/2021 | ............ G01K 17/00 |
| WO | WO-2011130320 A2 | * | 10/2011 | ......... G01N 21/3504 |

OTHER PUBLICATIONS

CN112287296A translation (Year: 2021).*

* cited by examiner

*Primary Examiner* — Lina Cordero
(74) *Attorney, Agent, or Firm* — Cooper Legal Group, LLC

(57) ABSTRACT

The present application discloses an anthropogenic heat flux estimation method and system based on flux observation data. The method includes: performing grid division on the selected region, and acquiring building vector data, land utilization data and instrument observation data in the selected region; calculating and correcting sensible heat fluxes and latent heat fluxes of different underlying surface types in a vorticity correlator flux source region; calculating temporal-spatial distribution of the sensible heat flux and the latent heat flux of each grid in a large-aperture scintillometer flux source region, and calculating temporal-spatial distribution of an anthropogenic heat flux of each grid in the flux source region in combination with a surface energy balance equation; and constructing an anthropogenic heat flux estimation model based on a convolutional neural network, and accurately estimating temporal-spatial distribution of the anthropogenic heat flux of each grid in the selected region.

8 Claims, 7 Drawing Sheets

ANTHROPOGENIC HEAT FLUX ESTIMATION METHOD AND SYSTEM BASED ON FLUX OBSERVATION DATA

FIELD OF THE INVENTION

The present invention relates to the field of anthropogenic heat flux estimation technologies, and in particular, to an anthropogenic heat flux estimation method and system based on flux observation data.

BACKGROUND OF THE INVENTION

Currently, an anthropogenic heat flux continuously produced in human production activities shows a continuous growing trend, representing an important reference index for urban surface energy balance, and accurate evaluation of the anthropogenic heat flux is of great significance for formulation of an urban development planning scheme under the larger context of urbanization.

In an existing anthropogenic heat flux evaluation method, estimation is usually performed by using an inventory method, a building energy model method and an energy balance remainder method. In the inventory method, estimation is mainly performed in time and space dimensions using energy consumption statistical data issued by a public department, but a time lag between energy consumption and the anthropogenic heat flux is neglected. In the building energy model method, a large amount of data calculation is usually required for modeling between building energy consumption and heat emission, and an estimation workload is large. In the energy balance remainder method, remainder calculation is performed using model calculation and a vorticity related flux, such that a remainder according to a surface energy balance equation is used as the anthropogenic heat flux, but a calculation result of the anthropogenic heat flux is subjected to a cumulative impact of various energy deviations, and meteorological conditions and underlying surface features at different times may influence a range of a flux observation source region.

In summary, the existing anthropogenic heat flux evaluation method has the defect that it is difficult to directly and accurately estimate time and space distribution of the anthropogenic heat flux in a regional scale (hectometer scale).

SUMMARY

In order to improve estimation accuracy of an anthropogenic heat flux in a regional scale, the present application provides an anthropogenic heat flux estimation method and system based on flux observation data.

The above first purpose of the present application is achieved by the following technical solution.

An anthropogenic heat flux estimation method based on flux observation data includes:

performing grid division on a selected region, and acquiring building vector data, land utilization data and instrument observation data in the selected region, the instrument observation data including vorticity correlator observation data, large-aperture scintillometer observation data and unmanned aerial vehicle thermal infrared imager observation data;

determining a vorticity correlator flux source region according to the vorticity correlator observation data, and obtaining a sensible heat flux correction value and a latent heat flux correction value of each underlying surface type in the vorticity correlator flux source region in combination with the building vector data, the land utilization data and the instrument observation data;

determining a large-aperture scintillometer flux source region according to the large-aperture scintillometer observation data, and calculating temporal-spatial distribution of a sensible heat flux and a latent heat flux of each grid in the large-aperture scintillometer flux source region based on the sensible heat flux correction value and the latent heat flux correction value of each underlying surface type and an area ratio of each underlying surface type in combination with the large-aperture scintillometer observation data;

calculating temporal-spatial distribution of an anthropogenic heat flux corresponding to each grid according to the temporal-spatial distribution of the sensible heat flux and the latent heat flux of each grid in the large-aperture scintillometer flux source region in combination with the instrument observation data; and dividing input information and the anthropogenic heat fluxes of the grids in the large-aperture scintillometer flux source region into a training set and a verification set according to a certain proportion, constructing an anthropogenic heat flux estimation model using a convolutional neural network algorithm, and estimating temporal-spatial distribution of an anthropogenic heat flux of each grid in the selected region by the anthropogenic heat flux estimation model.

By adopting the above technical solution, the hectometer-scale anthropogenic heat flux can be rapidly and accurately estimated. Specifically, the grid division is performed on the selected region, and a vorticity correlator, a large-aperture scintillometer and an unmanned aerial vehicle thermal infrared imager are arranged in the selected region to obtain real-time flux observation data of the selected region including the vorticity correlator observation data, the large-aperture scintillometer observation data and the unmanned aerial vehicle thermal infrared imager observation data, which simultaneously solves the problems of a flux data blank and data validity in a traditional method; the sensible heat flux and the latent heat flux of each underlying surface type in the vorticity correlator flux source region are calculated and corrected according to data, such as a vorticity correlator flux observation result, or the like, which is helpful to improve precision of a traditional surface flux calculation result; in combination with flux observation data of the large-aperture scintillometer, the temporal-spatial distribution of the sensible heat flux and the latent heat flux of each grid in the large-aperture scintillometer flux source region is calculated, and then, the anthropogenic heat flux of each grid in the large-aperture scintillometer flux source region is calculated, which is helpful to improve resolution (kilometer scale to hectometer scale) of the temporal-spatial distribution of the anthropogenic heat flux; a data set is constructed based on the calculation result, and the anthropogenic heat flux estimation model is constructed through a convolutional neural network, which can improve an estimation efficiency of the anthropogenic heat flux, realize rapid estimation of the anthropogenic heat flux of an observation region with a flux in the selected region, and also realize rapid estimation of the anthropogenic heat flux of an observation region without a flux in the selected region.

In a preferred example of the present application, the step of determining a vorticity correlator flux source region according to the vorticity correlator observation data, and obtaining a sensible heat flux correction value and a latent heat flux correction value of each underlying surface type in the vorticity correlator flux source region in combination with the building vector data, the land utilization data and the instrument observation data includes:

inputting the vorticity correlator observation data into a preset footprint model to obtain the vorticity correlator flux source region corresponding to the selected region;

calculating a sensible heat flux calculation value of each underlying surface type corresponding to the vorticity correlator flux source region according to the building vector data and the instrument observation data;

calculating a latent heat flux calculation value of each underlying surface type corresponding to the vorticity correlator flux source region according to the building vector data and the instrument observation data; and according to the land utilization data and the vorticity correlator observation data, performing data correction on the sensible heat flux calculation value and the latent heat flux calculation value of each underlying surface type corresponding to the vorticity correlator flux source region, so as to obtain a sensible heat flux correction value and a latent heat flux correction value of each underlying surface type in the vorticity correlator flux source region.

By adopting the above technical solution, the sensible heat flux and the latent heat flux of each underlying surface type in the vorticity correlator flux source region can be accurately estimated. Specifically, the vorticity correlator observation data is input into the footprint model to obtain the vorticity correlator flux source region, which is helpful to measure spatial representativeness of a vorticity correlator observation result; an average building height and an average vegetation height in the vorticity correlator flux source region are calculated according to the building vector data, influences of buildings and vegetation on aerodynamic impedance are comprehensively considered, and meanwhile, the vorticity correlator observation data and average surface temperature data of the unmanned aerial vehicle thermal infrared imager are used in combination, which can improve accuracy of calculation results of the sensible heat flux and the latent heat flux of each underlying surface type; the area ratio of each underlying surface type is calculated according to the land utilization data, and meanwhile, the sensible heat flux and the latent heat flux of each underlying surface type are corrected in combination with actual observation value of the vorticity correlator, which effectively reduces an error caused by measurement of the vorticity correlator on a heterogeneous underlying surface, thereby improving calculation precision of the sensible heat fluxes and the latent heat fluxes of various underlying surfaces.

In a preferred example of the present application, the step of calculating a sensible heat flux calculation value of each underlying surface type corresponding to the vorticity correlator flux source region according to the building vector data and the instrument observation data includes:

calculating sensible heat fluxes of a vegetation underlying surface and an impervious underlying surface by formula (1):

$$Q_{H,si} = \frac{\rho c_p (T_{si} - T_a)}{r_a} \quad (1)$$

where $Q_{H,si}$ is a sensible heat flux calculation value of an ith underlying surface type in the vorticity correlator flux source region, ρ is air density, $c_p$ is constant-pressure specific heat, $T_{si}$ is an average surface temperature of the ith underlying surface type, $T_a$ is an air temperature, $r_a$ is aerodynamic impedance, it is assumed that $r_a$ is constant in the same region, and $r_a$ is calculated by formula (2):

$$r_a = \frac{\ln\left(\frac{z_m - d}{z_{0m}}\right) \ln\left(\frac{z_h - d}{z_{0m}}\right)}{k^2 u_z} \quad (2)$$

where $z_m$ is a wind speed measurement height, $z_h$ is an air temperature measurement height, d is a zero plane displacement height, $z_{0m}$ is momentum roughness, $z_{0h}$ is heat roughness, $z_{0h}=0.1z_{0m}$, k is a Von Karman constant, $u_z$ is a wind speed, and d and $z_{0m}$ comprehensively consider the average building height $H_b$ and vegetation height $H_v$ of the vorticity correlator flux source region;

calculating a sensible heat flux of a water body underlying surface by formula (3):

$$Q_{H,sw} = 0.47(9.2 + 0.46 u_z^2)(T_{sw} - T_a) \quad (3)$$

where $Q_{H,sw}$ is a sensible heat flux calculation value of the water body underlying surface in the vorticity correlator flux source region, and $T_{sw}$ is an average surface temperature of the water body underlying surface.

By adopting the above technical solution, classified calculation is performed on the sensible heat fluxes of different types of underlying surfaces in the vorticity correlator flux source region, and the influences of the buildings and plants on the aerodynamic impedance are comprehensively considered, which can improve precision of the sensible heat flux calculation value.

In a preferred example of the present application, the step of calculating a latent heat flux calculation value of each underlying surface type corresponding to the vorticity correlator flux source region according to the building vector data and the instrument observation data includes:

calculating a net radiation flux received by a surface of each underlying surface type by formula (4):

$$R_n = (1-\alpha)SW_{in} - \sigma \varepsilon_i T_{si}^4 + \varepsilon_i LW_{in} \quad (4)$$

where $R_n$ is the net radiation flux received by the surface of each underlying surface type, $S_{Win}$ and $L_{Win}$ are solar short wave radiation and atmospheric long wave radiation respectively, $\alpha_i$ is a surface albedo of each underlying surface type, σ is a Stefan-Boltzmann constant, and $\varepsilon_i$ is a surface emissivity of each underlying surface type;

calculating a latent heat flux of the vegetation underlying surface by formula (5):

$$Q_{E,sv} = \frac{\Delta R_{n,v} + \rho c_p \frac{e_s - e_a}{r_a}}{\Delta + \gamma\left(1 + \frac{r_{s,v}}{r_a}\right)} \quad (3)$$

where $Q_{E,sv}$ is a latent heat flux calculation value of the vegetation underlying surface in the vorticity correlator flux source region, A is a slope of a saturated water vapor pressure curve, $R_{n,v}$ is a net radiation flux received by a vegetation surface, $e_s$ is a saturated water vapor pressure calculated according to an average surface temperature of the corresponding underlying surface, $e_a$ is an actual water vapor pressure, γ is a psychrometer constant, and $r_{s,v}$ is vegetation surface water vapor diffusion impedance calculated by formula (6):

$$r_{s,v} = \frac{1}{C_L m(T_{min}) m(VPD) LAI} \quad (6)$$

where $C_L$ is average potential stomatal conductance per unit leaf area, $m(T_{min})$ represents an air temperature stress function, $m(VPD)$ represents a water vapor pressure stress function, and LAI is a leaf area index;

calculating a latent heat flux of the water body underlying surface by formula (7):

$$Q_{E,sw} = \frac{\Delta R_{n,w} + \gamma f(u)(e_s - e_a)}{\Delta + \gamma} \quad (7)$$

where $Q_{E,sw}$ is a latent heat flux calculation value of the water body underlying surface in the vorticity correlator flux source region, $R_{n,w}$ is a net radiation flux received by a water body surface, a wind function is $f(u)=(2.33+1.65\ u)L^{-0.1}$, $L=0.5(A_w\pi)^{0.5}$, and $A_w$ is a water body area;

calculating a latent heat flux of the impervious underlying surface by formula (8):

$$Q_{E,si} = \frac{\Delta R_{n,i} + \rho c_p \frac{e_s - e_a}{r_a}}{\Delta + \gamma\left(1 + \frac{r_{s,i}}{r_a}\right)} \quad (8)$$

where $Q_{E,si}$ is a latent heat flux calculation value of the impervious underlying surface in the vorticity correlator flux source region, $R_{n,i}$ is a net radiation flux received by an impervious surface, $r_{s,i}$ is impervious surface water vapor diffusion impedance, $r_{s,i}=\exp(8.206-4.225\ W)$, and W is a wetting degree of the impervious surface.

By adopting the above technical solution, classified calculation is performed on the net radiation fluxes of different types of underlying surfaces in the vorticity correlator flux source region, and the latent heat fluxes of different types of underlying surfaces are calculated using the water vapor diffusion impedance, which can improve precision of the latent heat flux calculation value.

In a preferred example of the present application, the step of according to the land utilization data and the vorticity correlator observation data, performing data correction on the sensible heat flux calculation value and the latent heat flux calculation value of each underlying surface type corresponding to the vorticity correlator flux source region, so as to obtain a sensible heat flux correction value and a latent heat flux correction value of each underlying surface type in the vorticity correlator flux source region includes:

obtaining the sensible heat flux calculation value and a sensible heat flux observation value of the vorticity correlator of each underlying surface type at the same moment, correcting the sensible heat flux calculation value according to the area ratio and the sensible heat flux observation value of each underlying surface type, and taking an average value obtained using a slip averaging method as the sensible heat flux correction value of each underlying surface type at the moment, sensible heat flux correction values corresponding to the vegetation, water body and impervious underlying surfaces being calculated using formulas (9) to (11) respectively:

$$Q_{H,v\_t} = \frac{1}{n}\sum_{\tau=1}^{n}\left(\frac{f_{v\_\tau}Q_{H,sv\_\tau}}{f_{v\_\tau}Q_{H,sv\_\tau} + f_{w\_\tau}Q_{H,sw\_\tau} + f_{i\_\tau}Q_{H,si\_\tau}}\right)Q_{H,so\_t} \quad (9)$$

$$Q_{H,w\_t} = \frac{1}{n}\sum_{\tau=1}^{n}\left(\frac{f_{w\_\tau}Q_{H,sw\_\tau}}{f_{v\_\tau}Q_{H,sv\_\tau} + f_{w\_\tau}Q_{H,sw\_\tau} + f_{i\_\tau}Q_{H,si\_\tau}}\right)Q_{H,so\_t} \quad (10)$$

$$Q_{H,i\_t} = \frac{1}{n}\sum_{\tau=1}^{n}\left(\frac{f_{v\_\tau}Q_{H,sv\_\tau}}{f_{v\_\tau}Q_{H,sv\_\tau} + f_{w\_\tau}Q_{H,sw\_\tau} + f_{i\_\tau}Q_{H,si\_\tau}}\right)Q_{H,so\_t} \quad (11)$$

where n represents an observation time window required for slip averaging calculation, $Q_{H,v\_t}$, $Q_{H,w\_t}$ and $Q_{H,i\_t}$ are the sensible heat flux correction values corresponding to the vegetation, water body and impervious underlying surfaces at moment t respectively, $Q_{H,sv\_\tau}$, $Q_{H,sw\_\tau}$ and $Q_{H,si\_\tau}$ are the sensible heat flux calculation values corresponding to the vegetation, water body and impervious underlying surfaces at moment t of day $\tau$ respectively, $f_{v\_\tau}$, $f_{w\_\tau}$ and $f_{i\_\tau}$ are area ratios of the vegetation, water body and impervious underlying surfaces in the vorticity correlator flux source region at moment t of day $\tau$ respectively, and $Q_{H,so\_t}$ is the sensible heat flux observation value of the vorticity correlator at moment t of day $\tau$;

obtaining the latent heat flux calculation value and a latent heat flux observation value of the vorticity correlator of each underlying surface type at the same moment, correcting the latent heat flux calculation value according to the area ratio and the latent heat flux observation value of each underlying surface type, and taking an average value obtained using the slip averaging method as the latent heat flux correction value of each underlying surface type at the moment, latent heat flux correction values corresponding to the vegetation, water body and impervious underlying surfaces being calculated using formulas (12) to (14) respectively:

$$Q_{E,v\_t} = \frac{1}{n}\sum_{\tau=1}^{n}\left(\frac{f_{v\_\tau}Q_{E,sv\_\tau}}{f_{v\_\tau}Q_{E,sv\_\tau} + f_{w\_\tau}Q_{E,sw\_\tau} + f_{i\_\tau}Q_{E,si\_\tau}}\right)Q_{E,so\_t} \quad (12)$$

$$Q_{E,w\_t} = \frac{1}{n}\sum_{\tau=1}^{n}\left(\frac{f_{w\_\tau}Q_{E,sw\_\tau}}{f_{v\_\tau}Q_{E,sv\_\tau} + f_{w\_\tau}Q_{E,sw\_\tau} + f_{i\_\tau}Q_{E,si\_\tau}}\right)Q_{E,so\_t} \quad (13)$$

$$Q_{E,i\_t} = \frac{1}{n}\sum_{\tau=1}^{n}\left(\frac{f_{i\_\tau}Q_{E,si\_\tau}}{f_{v\_\tau}Q_{E,sv\_\tau} + f_{w\_\tau}Q_{E,sw\_\tau} + f_{i\_\tau}Q_{E,si\_\tau}}\right)Q_{E,so\_t} \quad (14)$$

where $Q_{E,v\_t}$, $Q_{E,w\_t}$ and $Q_{E,i\_t}$ are the latent heat flux correction values corresponding to the vegetation, water body and impervious underlying surfaces at moment t respectively, $Q_{E,sv\_\tau}$, $Q_{E,sw\_\tau}$ and $Q_{E,si\_\tau}$ are the latent heat flux calculation values corresponding to the vegetation, water body and impervious underlying surfaces at moment t of day $\tau$ respectively, and $Q_{E,so\_t}$ is the latent heat flux observation value of the vorticity correlator at moment t of day $\tau$.

By adopting the above technical solution, the precision of the calculation results of the sensible heat flux and the latent heat flux of each underlying surface type in the vorticity correlator flux source region can be improved. Specifically, the sensible heat flux and latent heat flux calculation values are corrected based on the sensible heat flux and latent heat flux observation values, which can effectively compensate deviations between the sensible heat flux and latent heat flux calculation values and sensible heat flux and latent heat flux actual values; the area ratio of each underlying surface type is used as a correction coefficient, which can effectively improve the precision of the calculation results of the sensible heat flux and the latent heat flux of each underlying surface type; meanwhile, the correction value is averaged by using the slip averaging method, which can reduce an influence of abnormal values on the result, thus improving robustness of the subsequently constructed anthropogenic heat flux estimation model on a level of the training set.

In a preferred example of the present application, the step of determining a large-aperture scintillometer flux source region according to the large-aperture scintillometer observation data, and calculating temporal-spatial distribution of a sensible heat flux and a latent heat flux of each grid in the large-aperture scintillometer flux source region based on the sensible heat flux correction value and the latent heat flux correction value of each underlying surface type and an area ratio of each underlying surface type in combination with the large-aperture scintillometer observation data includes:

inputting the large-aperture scintillometer observation data into the preset footprint model to obtain the large-aperture scintillometer flux source region corresponding to the selected region;

based on the sensible heat flux correction value, the latent heat flux correction value and the corresponding area ratio of each underlying surface type, calculating a sensible heat flux ratio coefficient and a latent heat flux ratio coefficient of each grid in the large-aperture scintillometer flux source region at the same moment, the sensible heat flux ratio coefficient and the latent heat flux ratio coefficient being calculated by formulas (15) and (16) respectively:

$$\phi_{j,H\_t} = \frac{f_{j,v\_t}Q_{H,v\_t} + f_{j,w\_t}Q_{H,w\_t} + f_{j,i\_t}Q_{H,i\_t}}{F_{v\_t}Q_{H,v\_t} + F_{w\_t}Q_{H,w\_t} + F_{i\_t}Q_{H,i\_t}} \quad (15)$$

$$\phi_{j,E\_t} = \frac{f_{j,v\_t}Q_{E,v\_t} + f_{j,w\_t}Q_{E,w\_t} + f_{j,i\_t}Q_{E,i\_t}}{F_{v\_t}Q_{E,v\_t} + F_{w\_t}Q_{E,w\_t} + F_{i\_t}Q_{E,i\_t}} \quad (16)$$

where $\phi_{j,H\_t}$ represents a sensible heat flux ratio coefficient of a jth grid at moment t, $\phi_{j,E\_t}$ represents a latent heat flux ratio coefficient of the jth grid at moment t, $f_{j,v\_t}$, $f_{j,w\_t}$ t and $f_{j,i\_t}$ are area ratios of the vegetation, water body and impervious underlying surfaces of the jth grid at moment t respectively, $F_{v\_t}$, $F_{w\_t}$ and $F_{i\_t}$ are area ratios of the vegetation, water body and impervious underlying surfaces in the large-aperture scintillometer flux source region at moment t respectively, $Q_{H,v\_t}$, $Q_{H,w\_t}$ and $Q_{H,i\_t}$ are the sensible heat flux correction values of the vegetation, water body and impervious underlying surfaces at moment t respectively, and $Q_{E,v\_t}$, $Q_{E,w\_t}$ and $Q_{E,i\_t}$ are the latent heat flux correction values of the vegetation, water body and impervious underlying surfaces at moment t;

calculating the sensible heat flux and the latent heat flux of each grid in the large-aperture scintillometer flux source region according to the sensible heat flux ratio coefficient, the latent heat flux ratio coefficient as well as a sensible heat flux observation value and a latent heat flux observation value of the large-aperture scintillometer, the sensible heat flux and the latent heat flux being calculated by formulas (17) and (18) respectively:

$$Q_{H,j\_t} = \phi_{j,H\_t} Q_{H,o\_t} \quad (17)$$

$$Q_{E,j\_t} = \phi_{j,E\_t} Q_{E,o\_t} \quad (18)$$

where $Q_{H,j\_t}$ and $Q_{E,j\_t}$ represent a sensible heat flux and a latent heat flux of the jth grid in the large-aperture scintillometer flux source region at moment t respectively, and $Q_{H,o\_t}$ and $Q_{E,o\_t}$ represent a sensible heat flux observation value and a latent heat flux observation value of the large-aperture scintillometer at moment t respectively.

By adopting the above technical solution, precision and spatial resolution of calculation results of the sensible heat flux and the latent heat flux of each grid in the large-aperture scintillometer flux source region are improved. Specifically, the large-aperture scintillometer observation data is input into the footprint model to obtain the large-aperture scintillometer flux source region, which is helpful to measure spatial representativeness of a large-aperture scintillometer observation result; based on the sensible heat flux and latent heat flux correction values and the corresponding area ratio of each underlying surface type, the ratio coefficients of the sensible heat flux and the latent heat flux are proposed, which can effectively improve the precision of the calculation results of the sensible heat flux and the latent heat flux of each grid; results of the sensible heat flux and the latent heat flux of each grid in the large-aperture scintillometer flux source region are obtained in combination with the sensible heat flux and latent heat flux observation values of the large-aperture scintillometer, such that large-range observation flux results can be scientifically and effectively distributed to all the grids, thereby obtaining the sensible heat flux and latent heat flux results with high temporal-spatial resolution in the large-aperture scintillometer flux source region.

In a preferred example of the present application, the step of calculating temporal-spatial distribution of an anthropogenic heat flux corresponding to each grid according to the temporal-spatial distribution of the sensible heat flux and the latent heat flux of each grid in the large-aperture scintillometer flux source region in combination with the instrument observation data includes:

calculating a soil heat flux of each grid in the large-aperture scintillometer flux source region according to an area and the average surface temperature of each underlying surface type, the soil heat flux being calculated by formula (19):

$$Q_{G,j\_t} = \sum_{i=1}^{n} Q_{G,i} = \sum_{i=1}^{n} \frac{1}{A_i} \int_V C_i \frac{dT_s}{dt} dV \quad (19)$$

where $Q_{G,J\_t}$ is a soil heat flux of the jth grid at moment t, i represents an nth underlying surface type of the jth grid, $A_i$ is an area of the ith underlying surface of the jth grid, $C_i$ is heat capacity of the ith underlying surface of the jth grid, $dT_s/dt$ is an average surface temperature change in a given time, and dV is a volume of the underlying surface of the observed region;

calculating a net radiation flux of each grid according to the area ratio of each underlying surface type in each grid in the large-aperture scintillometer flux source region and the vorticity correlator observation data, the net radiation flux being calculated by formula (20);

$$R_{n,j\_t} = f_{v\_t} R_{n,v} + f_{w\_t} R_{n,w} + f_{i\_t} R_{n,i} \quad (20)$$

where $R_{n,j\_t}$ is a net radiation flux of the jth grid at moment t; $R_{n,v}$, $R_{n,w}$ and $R_{n,i}$ are the net radiation fluxes of the underlying surface types calculated according to formula (4) respectively; $f_{v\_t}$, $f_{w\_t}$ and $f_{i\_t}$ are the area ratios of the vegetation, water body and impervious underlying surface types of the jth grid at moment t; and calculating the temporal-spatial distribution of the anthropogenic heat flux of the grid according to the sensible heat flux, the latent heat flux, the soil heat flux and the net radiation flux correspond to each grid in the large-aperture scintillometer flux source region.

By adopting the above technical solution, the temporal-spatial distribution of the anthropogenic heat flux of each grid in the large-aperture scintillometer flux source region can be scientifically and effectively estimated. Specifically, the average surface temperature of each underlying surface type is continuously observed by the unmanned aerial vehicle thermal infrared imager, and the soil heat flux of each grid in the large-aperture scintillometer flux source region is obtained using physical property parameters of the underlying surface, such that the soil heat flux of a large-area region in a certain period can be rapidly and accurately calculated; the net radiation flux measured by the vorticity correlator is subjected to area weighted averaging in combination with the area ratio of each underlying surface type, such that the net radiation flux of a large-area region in a certain period can be quickly and accurately calculated; further, the anthropogenic heat flux can be obtained in combination with an energy balance equation.

In a preferred example of the present application, the step of dividing input information and the anthropogenic heat fluxes of the grids in the large-aperture scintillometer flux source region into a training set and a verification set according to a certain proportion, constructing an anthropogenic heat flux estimation model using a convolutional neural network algorithm, and estimating temporal-spatial distribution of an anthropogenic heat flux of each grid in the selected region by the anthropogenic heat flux estimation model includes:

dividing the input information and the anthropogenic heat flux of each grid in the large-aperture scintillometer flux source region into the training set and the verification set according to the certain proportion, the input information including an average building height, an average vegetation height, the area ratio and the corresponding average surface temperature of each underlying surface type, as well as an air temperature, long wave radiation, short wave radiation, a wind speed, the sensible heat flux and the latent heat flux observed by the large-aperture scintillometer;

constructing the anthropogenic heat flux estimation model according to the training set and the verification set based on the convolutional neural network algorithm; and inputting the input information of each grid in the selected region through the anthropogenic heat flux estimation model, and outputting the temporal-spatial distribution of the anthropogenic heat fluxes of all the grids in the selected region.

By adopting the above technical solution, the anthropogenic heat flux of each grid in the selected region can be rapidly estimated, and the temporal-spatial distribution of the flux can be obtained, which facilitates relevant research of urban planning. Specifically, the input information and the anthropogenic heat flux of each grid in the large-aperture scintillometer flux source region are divided into the training set and the verification set according to the certain proportion, which can effectively guarantee training and verification of the model. This helps to avoid over-fitting and under-fitting problems, thereby improving a generalization capability of the model; compared with a traditional interpolation technology, such as temporal-spatial Kriging, or the like, the anthropogenic heat flux estimation model constructed based on a convolutional neural network method can consider more influence factors and effectively capture a spatial dependence relationship in data, thereby improving the precision of the anthropogenic heat flux result in spatial distribution; since this model can handle a variety of different types of input information (for example, building morphology data, land utilization data, and other meteorological data), it can be quickly applied to a variety of different geographic environments and city types, such that the present invention has a wide application range.

The above second purpose of the present application is achieved by the following technical solution.

An anthropogenic heat flux estimation system based on flux observation data includes:

a data processing module configured to perform grid division on a selected region, and acquire building vector data, land utilization data and instrument observation data in the selected region, the instrument observation data including vorticity correlator observation data, large-aperture scintillometer observation data and unmanned aerial vehicle thermal infrared imager observation data;

an underlying surface type sensible heat and latent heat flux calculation module configured to determine a vorticity correlator flux source region according to the vorticity correlator observation data, and obtain a sensible heat flux correction value and a latent heat flux correction value of each underlying surface type in the vorticity correlator flux source region in combination with the building vector data, the land utilization data and the instrument observation data;

a grid sensible heat and latent heat flux calculation module configured to determine a large-aperture scintillometer flux source region according to the large-aperture scintillometer observation data, and calculate temporal-spatial distribution of a sensible heat flux and a latent heat flux of each grid in the large-aperture scintillometer flux source region based on the sensible heat flux correction value and the latent heat flux correction value of each underlying surface type and an area ratio of each underlying surface type in combination with the large-aperture scintillometer observation data;

a grid anthropogenic heat flux calculation module configured to calculate temporal-spatial distribution of an anthropogenic heat flux corresponding to each grid according to the temporal-spatial distribution of the sensible heat flux and the latent heat flux of each grid in the large-aperture scintillometer flux source region in combination with the instrument observation data; and an anthropogenic heat flux estimation module configured to divide input information and the anthropogenic heat fluxes of the grids in the large-aperture scintillometer flux source region into a training set and a verification set according to a certain proportion, construct an anthropogenic heat flux estimation model using a convolutional neural network algorithm, and estimate temporal-spatial distribution of an anthropogenic heat flux of each grid in the selected region by the model.

In summary, the present application can achieve at least one of the following beneficial effects:

1. Less limitation to data: the proposed method relies on multiple data sources, including the instrument observation data, rather than only on energy consumption data published by a public department, thus directly avoiding the problem of a time lag between energy consumption and the anthropogenic heat flux; meanwhile, a method of combining the large-aperture scintillometer and the vorticity correlator is selected for observation, thus effectively compensating limitation of the vorticity correlator in an observation range and the spatial representativeness;

2. Low calculation complexity and reliable precision: complexity of building energy consumption and heat emission modeling is avoided by using the surface energy balance equation, and meanwhile, the sensible heat flux and the latent heat flux can be more accurately measured by combining the observation data of the large-aperture scintillometer and the vortex motion correlator, thereby better estimating the anthropogenic heat flux;

3. High calculation efficiency: based on the high-precision, high-frequency and large-range anthropogenic heat flux training set, an anthropogenic heat flux prediction model is constructed according to the convolutional neural network, such that spatial asymmetry and time non-overlapping in the traditional method can be effectively solved, thereby providing a rapid and scientific anthropogenic heat flux calculation method for the selected region; and 4. Wide applicability and expandability: the proposed method can be adapted to various urban environments and scales, making it a universal tool for estimating the anthropogenic heat flux. The adaptability enables researchers and urban planners to better understand and address challenges related to energy consumption, an urban heat island effect, and climate change adaptation.

DETAILED DESCRIPTION

The present application will be further described below in details with reference to the accompanying drawings.

Figure 1:
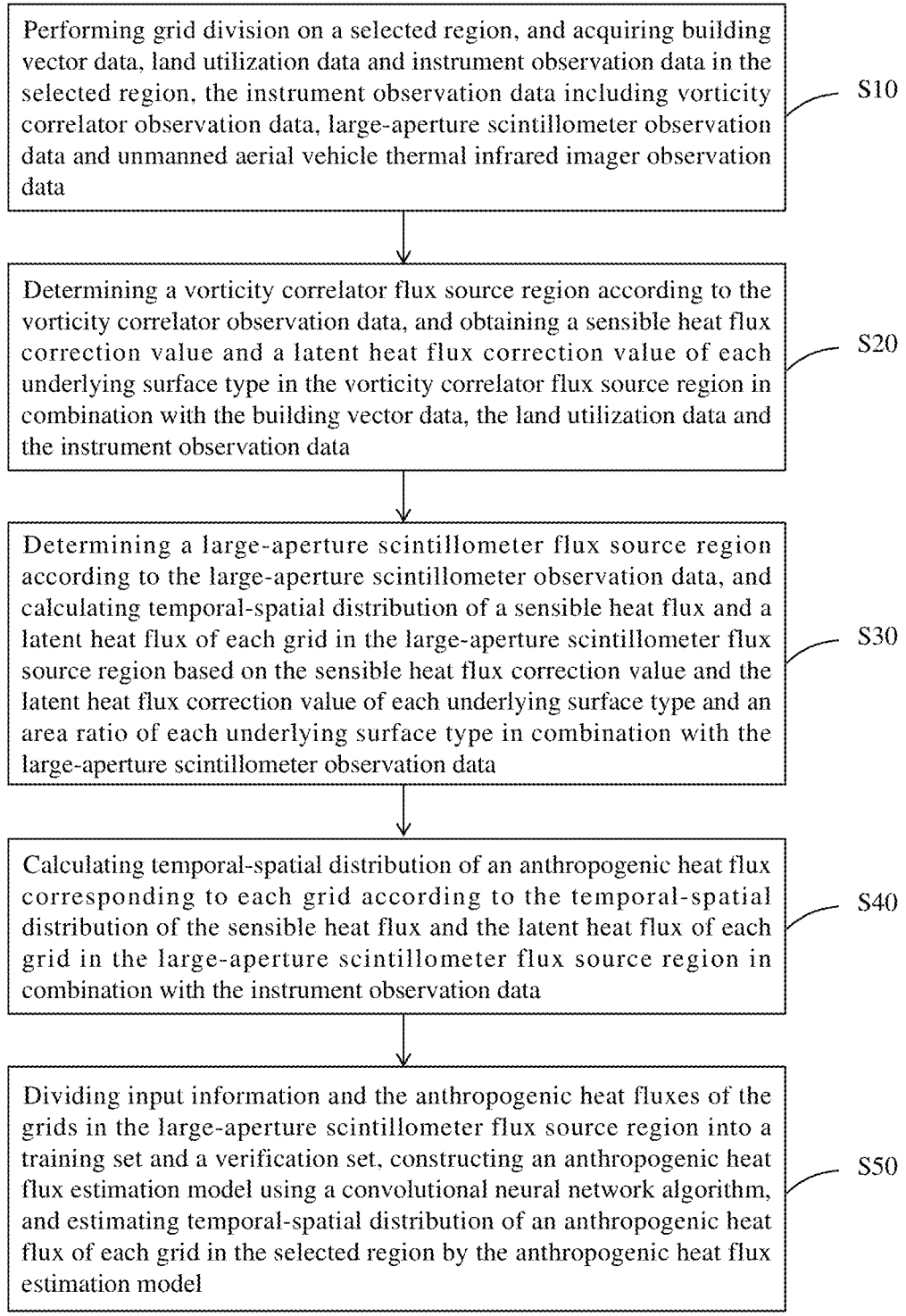
FIG. 1 is a flow chart of implementation of an anthropogenic heat flux estimation method based on flux observation data.

In an embodiment, as shown in FIG. 1, the present application discloses an anthropogenic heat flux estimation method based on flux observation data, including the following steps:

S10: performing grid division on a selected region, and acquiring building vector data, land utilization data and instrument observation data in the selected region, the instrument observation data including vorticity correlator observation data, large-aperture scintillometer observation data and unmanned aerial vehicle thermal infrared imager observation data.

Figure 3:
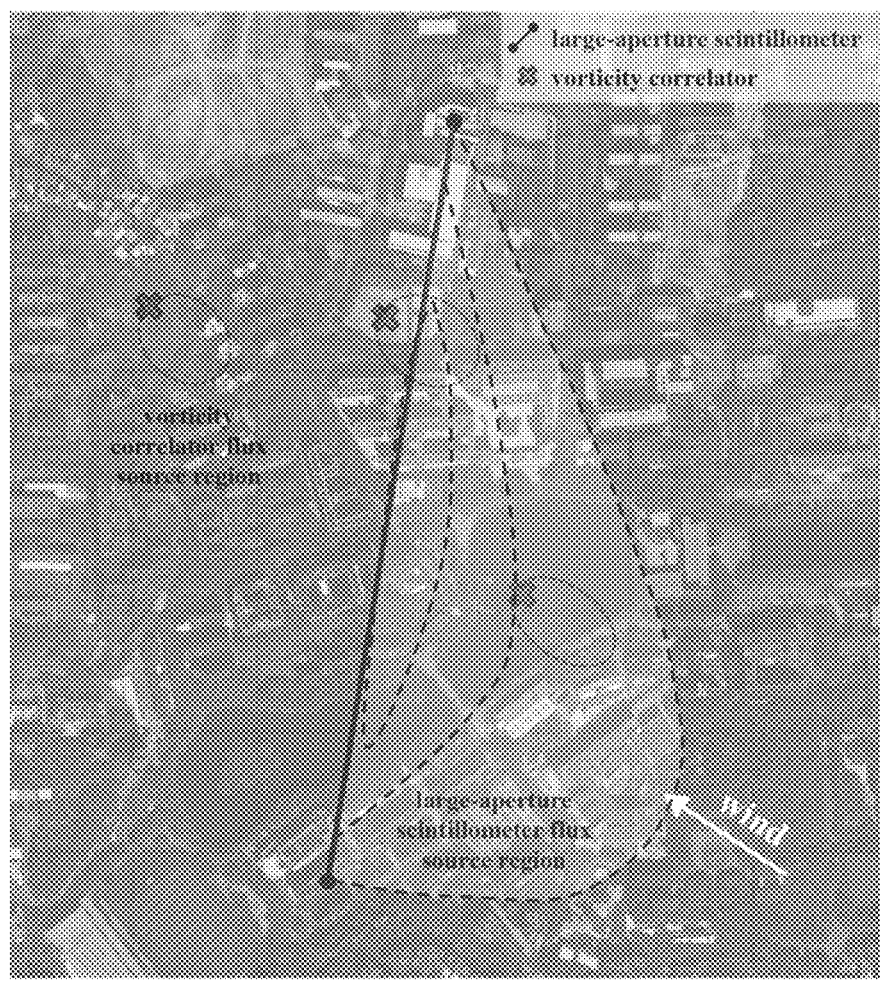
FIG. 3 is a schematic diagram of an arrangement of flux observation instruments and flux source regions thereof in an embodiment of the present application.

Specifically, the step S10 includes the following steps:

performing the grid division on the selected region according to research needs, and erecting a large-aperture scintillometer and a vorticity correlator in the selected region to observe the selected region, a flux observation arrangement of the selected region in the present embodiment being shown in FIG. 3, an emitting end and a receiving end of the large-aperture scintillometer being erected on two opposite sides of the selected region, and the vorticity correlators being erected on vegetation, water body and impervious underlying surface types of the selected region respectively; the large-aperture scintillometer measuring a sensible heat flux and a latent heat flux of a heterogeneous underlying surface in a large range using a light scintillation method, and the vorticity correlator measuring a sensible heat flux and a latent heat flux of a homogeneous underlying surface in a small range;

collecting and acquiring the building vector data and the land utilization data in the selected region using public data; a corresponding average building height being calculated according to the building vector data, an area ratio of each corresponding underlying surface type being calculated according to the land utilization data, and temperature, humidity, wind speed, wind direction, long wave radiation, short wave radiation and average surface temperature of each corresponding underlying surface type being obtained according to the instrument observation data.

It should be noted that, in the present embodiment, the building vector data, the land utilization data, and the instrument observation data are further preprocessed according to spatial distribution and a time sequence of the data, and the preprocessing process includes correction of the data, removal of abnormal values, filling of missing values, conversion of data formats, merging of data sets, or the like.

S20: determining a vorticity correlator flux source region according to the vorticity correlator observation data, and obtaining a sensible heat flux correction value and a latent heat flux correction value of each underlying surface type in the vorticity correlator flux source region in combination with the building vector data, the land utilization data and the instrument observation data.

Specifically, the step S20 includes the following steps:

S201: inputting the vorticity correlator observation data into a preset footprint model to obtain the vorticity correlator flux source region corresponding to the selected region.

Specifically, roughness of a surface in the selected region, a measurement height of the vorticity correlator and the wind speed, the wind direction and atmospheric stability data in an observation time period are obtained, and the information is input into the footprint model preset in FREddyPro software for calculation to obtain the vorticity correlator flux source region corresponding to the selected region. In the present embodiment, the footprint model is a Kljun model.

S202: calculating a sensible heat flux calculation value of each underlying surface type corresponding to the vorticity correlator flux source region according to the building vector data and the instrument observation data.

Figure 4:
FIG. 4 is a classification diagram of various types of underlying surfaces in the embodiment of the present application.

Specifically, the step S202 includes the following steps:

acquiring underlying surface type data in the vorticity correlator flux source region including underlying surface types, such as a vegetation underlying surface, an impervious underlying surface, a water body underlying surface, or the like, classification of the underlying surfaces in the present embodiment being shown in FIG. 4, and the sensible heat fluxes of the underlying surface types in the vorticity correlator flux source region being calculated according to formula (1) and formula (3);

calculating sensible heat fluxes of the vegetation underlying surface and the impervious underlying surface by formula (1):

$$Q_{H,si} = \frac{\rho c_p (T_{si} - T_a)}{r_a} \quad (1)$$

where $Q_{H,si}$ is a sensible heat flux of an ith underlying surface type calculated in the vorticity correlator flux source region; p is air density; $c_p$ is constant-pressure specific heat; $T_{si}$ is an average surface temperature of the ith underlying surface type; $T_a$ is an air temperature; $r_a$ is aerodynamic impedance, it is assumed that $r_a$ is constant in the same region, and $r_a$ is calculated according to formula (2):

$$r_a = \frac{\ln\left(\frac{z_m - d}{z_{0m}}\right)\ln\left(\frac{z_h - d}{z_{0m}}\right)}{k^2 u_z} \quad (2)$$

where $z_m$ is a wind speed measurement height; $z_h$ is an air temperature measurement height; d is a zero plane displacement height; $z_{0m}$ is momentum roughness; $z_h$ is heat roughness, $z_h=0.1z_{0m}$; k is a Von Karman constant and is 0.41 in the present embodiment; $u_z$ is a current wind speed, d and $z_{0m}$ comprehensively consider the average building height and vegetation height of the vorticity correlator flux source region, and d is calculated according to formula (21);

$$d = [1 + \alpha^{-\lambda_p}(\lambda_p - 1)]H_{av} \quad (21)$$

where constant $\alpha$ is 4.43; $H_{av}$ is a roughness element mean height (for example, $H_b$ or $H_v$); and $\lambda_p$ is an area ratio of a roughness element to the vorticity correlator flux source region;

in the present embodiment, $z_{0m}$ being calculated according to formula (22):

$$z_{0m} = \left(1 - \frac{d}{H_{av}}\right)\exp\left[-\left(\frac{1}{k^2}0.5\beta C_{Db}\left(1 - \frac{d}{H_{av}}\right)\frac{A_{fb} + P_v A_{fv}}{A_r}\right)^{-0.5}\right]H_{av} \quad (22)$$

where β is a resistance correction coefficient, and is 1 in the present embodiment, and other values may be selected according to actual needs; $C_{Db}$ is a resistance coefficient of a building, and is 1.2 in the present embodiment; $A_{fb}$ is a windward area index of the building; $A_{fv}$ is a windward area index of vegetation; $P_v$ is a ratio of a vegetation resistance coefficient to the building resistance coefficient, and is calculated according to formula (23):

$$P_v = \frac{C_{Dv}}{C_{Db}} = \frac{-1.251 P_{3D}^2 + 0.489 P_{3D} + 0.803}{C_{Db}} \quad (23)$$

where $P_{3D}$ is porosity of the vegetation, and $C_{Dv}$ is the vegetation resistance coefficient; and calculating a sensible heat flux of the water body underlying surface by formula (3):

$$Q_{H,sw} = 0.47(9.2 + 0.46 u_z^2)(T_{sw} - T_a) \quad (3)$$

where $Q_{H,sw}$ is a sensible heat flux of the water body underlying surface calculated in the vorticity correlator flux source region, and $T_{sw}$ is an average surface temperature of a water body.

In an embodiment, in order to accurately calculate the aerodynamic impedance ra, step S202 further includes:

according to the building vector data, calculating morphological feature parameters, such as a building area, the average building height, or the like, of the vorticity correlator flux source region, so as to calculate the average building height $H_b$ in the vorticity correlator flux source region by formula (24):

$$H_b = \frac{\sum_i^n a_i h_i}{A_b} \quad (24)$$

where $H_b$ represents the average building height in the vorticity correlator flux source region, i represents an ith building in the vorticity correlator flux source region, n represents a number of all the buildings in the vorticity correlator flux source region, $a_i$ represents a base area of the ith building in the vorticity correlator flux source region, $h_i$ represents a building height of the ith building in the vorticity correlator flux source region, and $A_b$ represents a total base area of the buildings in the vorticity correlator flux source region; and according to annual average rainfall data observed by the vorticity correlator, calculating an average vegetation height $H_v$ in the vorticity correlator flux source region by formula (25):

$$H_v = \frac{22.47}{1 + \exp[-0.046(P - 445.17)]} \quad (25)$$

where $H_v$ represents a vegetation height in the vorticity correlator flux source region, and P represents annual average rainfall. It should be noted that when the annual average rainfall in the selected region cannot be obtained, alternative calculation may be performed using annual average rainfall of an adjacent meteorological site of the selected region, and the present invention is not limited to the calculation method in the present embodiment.

S203: calculating a latent heat flux calculation value of each underlying surface type corresponding to the vorticity correlator flux source region according to the building vector data and the instrument observation data.

Specifically, the step S203 includes the following steps:

calculating a net radiation flux received by a surface of each type according to formula (4):

$$R_n = (1 - \alpha_i)SW_{in} - \sigma \varepsilon_i T_{si}^4 + \varepsilon_i LW_{in} \quad (4)$$

where $R_n$ is the net radiation flux received by the surface of each underlying surface type, $S_{Win}$ and $L_{Win}$ are solar short wave radiation and atmospheric long wave radiation respectively, $\alpha_i$ is a surface albedo of each underlying surface type, $\sigma$ is a Stefan-Boltzmann constant, and $\varepsilon_i$ is a surface emissivity of each underlying surface type;

calculating the latent heat fluxes of different types of underlying surfaces according to the underlying surface types, the latent heat flux of the vegetation underlying surface being calculated by formula (5):

$$Q_{E,sv} = \frac{\Delta R_{n,v} + \rho c_p \frac{e_s - e_a}{r_a}}{\Delta + \gamma\left(1 + \frac{r_{s,v}}{r_a}\right)} \tag{5}$$

where $Q_{E,sv}$ is the latent heat flux of the vegetation underlying surface calculated in the vorticity correlator flux source region; $\Delta$ is a slope of a saturated water vapor pressure curve; $R_{n,v}$ is a net radiation flux received by a vegetation surface; $e_s$ is a saturated water vapor pressure calculated according to an average surface temperature of the corresponding underlying surface; $e_a$ is an actual water vapor pressure; $\gamma$ is a psychrometer constant; and $r_{s,v}$ is vegetation surface water vapor diffusion impedance calculated by formula (6):

$$r_{s,v} = \frac{1}{C_L m(T_{min}) m(VPD) LAI} \tag{6}$$

where $C_L$ is average potential stomatal conductance per unit leaf area; LAI is a leaf area index; $m(T_{min})$ represents an air temperature stress function and is calculated by formula (26); m(VPD) represents a water vapor pressure stress function, and is calculated by formula (27):

$$m(T_{min}) = \begin{cases} 1.0 & T_{min} \geq T_{min\_open} \\ \frac{T_{min} - T_{min\_close}}{T_{min\_open} - T_{min\_close}} & T_{min\_close} < VPD < T_{min\_open} \\ 0.1 & T_{min} \leq T_{min\_close} \end{cases} \tag{26}$$

$$m(VPD) = \begin{cases} 1.0 & VPD \leq VPD_{open} \\ \frac{VPD_{close} - VPD}{VPD_{close} - VPD_{open}} & VPD_{open} < VPD < VPD_{close} \\ 0.1 & VPD \geq VPD_{close} \end{cases} \tag{27}$$

calculating a latent heat flux of the water body underlying surface by formula (7):

$$Q_{E,sw} = \frac{\Delta R_{n,w} + \gamma f(u)(e_s - e_a)}{\Delta + \gamma} \tag{7}$$

where $Q_{E,sw}$ is the latent heat flux of the water body underlying surface calculated in the vorticity correlator flux source region; $R_{n,w}$ is a net radiation flux received by a water body surface; a wind function is $f(u) = (2.33 + 1.65\,u) L^{-0.1}$, $L = 0.5(A_w \pi)^{0.5}$, and $A_w$ is a water body area;

calculating a latent heat flux of the impervious underlying surface by formula (8):

$$Q_{E,si} = \frac{\Delta R_{n,i} + \rho c_p \frac{e_s - e_a}{r_a}}{\Delta + \gamma\left(1 + \frac{r_{s,i}}{r_a}\right)} \tag{8}$$

where $Q_{E,si}$ is the latent heat flux of the impervious underlying surface calculated in the vorticity correlator flux source region; $R_{n,i}$ is a net radiation flux received by an impervious surface; $r_{s,i}$ is impervious surface water vapor diffusion impedance, $r_{s,i} = \exp(8.206 - 4.225\,W)$, and W is a wetting degree of the impervious surface.

S204: according to the land utilization data and the vorticity correlator observation data, performing data correction on the sensible heat flux calculation value and the latent heat flux calculation value of each underlying surface type corresponding to the vorticity correlator flux source region, so as to obtain a sensible heat flux correction value and a latent heat flux correction value of each underlying surface type.

Specifically, the step S204 includes the following steps:
obtaining the sensible heat flux calculation value and a sensible heat flux observation value of the vorticity correlator of each underlying surface type at the same moment, correcting the sensible heat flux calculation value according to the area ratio and the sensible heat flux observation value of each underlying surface type, and taking an average value obtained using a slip averaging method as the sensible heat flux correction value of each underlying surface type at the moment, sensible heat flux correction values corresponding to the vegetation, water body and impervious underlying surfaces being calculated using formulas (9) to (11) respectively:

$$Q_{H,v\_t} = \frac{1}{n}\sum_{\tau=1}^{n}\left(\frac{f_{v\_\tau} Q_{H,sv\_\tau}}{f_{v\_\tau} Q_{H,sv\_\tau} + f_{w\_\tau} Q_{H,sw\_\tau} + f_{i\_\tau} Q_{H,si\_\tau}}\right) Q_{H,so\_t} \tag{9}$$

$$Q_{H,w\_t} = \frac{1}{n}\sum_{\tau=1}^{n}\left(\frac{f_{w\_\tau} Q_{H,sw\_\tau}}{f_{v\_\tau} Q_{H,sv\_\tau} + f_{w\_\tau} Q_{H,sw\_\tau} + f_{i\_\tau} Q_{H,si\_\tau}}\right) Q_{H,so\_t} \tag{10}$$

$$Q_{H,i\_t} = \frac{1}{n}\sum_{\tau=1}^{n}\left(\frac{f_{i\_\tau} Q_{H,si\_\tau}}{f_{v\_\tau} Q_{H,sv\_\tau} + f_{w\_\tau} Q_{H,sw\_\tau} + f_{i\_\tau} Q_{H,si\_\tau}}\right) Q_{H,so\_t} \tag{11}$$

where n represents an observation time window required for slip averaging calculation, $Q_{H,v\_t}$, $Q_{H,w\_t}$ and $Q_{H,i\_t}$ are the sensible heat flux correction values corresponding to the vegetation, water body and impervious underlying surfaces at moment t respectively, $Q_{H,sv\_\tau}$, $Q_{H,sw\_\tau}$ and $Q_{H,si\_\tau}$ are the sensible heat flux calculation values corresponding to the vegetation, water body and impervious underlying surfaces at moment t of day t respectively, $f_{v\_\tau}$, $f_{w\_\tau}$ and $f_{i\_\tau}$ are area ratios of the vegetation, water body and impervious underlying surfaces in the vorticity correlator flux source region at moment t of day $\tau$ respectively, and $Q_{H,so\_t}$ is the sensible heat flux observation value of the vorticity correlator at moment t of day $\tau$; it should be noted that, in the present embodiment, 5 days serve as a window period for slip averaging, and therefore, it is necessary to ensure that an observation period is greater than 5 days;

obtaining the latent heat flux calculation value and a latent heat flux observation value of the vorticity correlator of each underlying surface type at the same moment, correcting the latent heat flux calculation value according to the area ratio and the latent heat flux observation value of each underlying surface type, and taking an average value obtained using the slip averaging method as the latent heat flux correction value of each underlying surface type at the moment, latent heat flux correction values corresponding to the vegetation, water body and impervious underlying surfaces being calculated using formulas (12) to (14) respectively:

$$Q_{E,v\_t} = \frac{1}{n}\sum_{\tau=1}^{n}\left(\frac{f_{v\_\tau}Q_{E,sv\_\tau}}{f_{v\_\tau}Q_{E,sv\_\tau}+f_{w\_\tau}Q_{E,sw\_\tau}+f_{i\_\tau}Q_{E,si\_\tau}}\right)Q_{E,so\_t} \quad (12)$$

$$Q_{E,w\_t} = \frac{1}{n}\sum_{\tau=1}^{n}\left(\frac{f_{w\_\tau}Q_{E,sw\_\tau}}{f_{v\_\tau}Q_{E,sv\_\tau}+f_{w\_\tau}Q_{E,sw\_\tau}+f_{i\_\tau}Q_{E,si\_\tau}}\right)Q_{E,so\_t} \quad (13)$$

$$Q_{E,i\_t} = \frac{1}{n}\sum_{\tau=1}^{n}\left(\frac{f_{i\_\tau}Q_{E,si\_\tau}}{f_{v\_\tau}Q_{E,sv\_\tau}+f_{w\_\tau}Q_{E,sw\_\tau}+f_{i\_\tau}Q_{E,si\_\tau}}\right)Q_{E,so\_t} \quad (14)$$

where n represents the observation time window required for slip averaging calculation, $Q_{E,v\_t}$, $Q_{E,w\_t}$ and $Q_{E,i\_t}$ are the latent heat flux correction values corresponding to the vegetation, water body and impervious underlying surfaces at moment t respectively, $Q_{E,sv\_\tau}$, $Q_{E,sw\_\tau}$ and $Q_{E,si\_\tau}$ are the latent heat flux calculation values corresponding to the vegetation, water body and impervious underlying surfaces at moment t of day t respectively, and $Q_{E,so\_t}$ is the latent heat flux observation value of the vorticity correlator at moment t of day τ.

Figure 5:
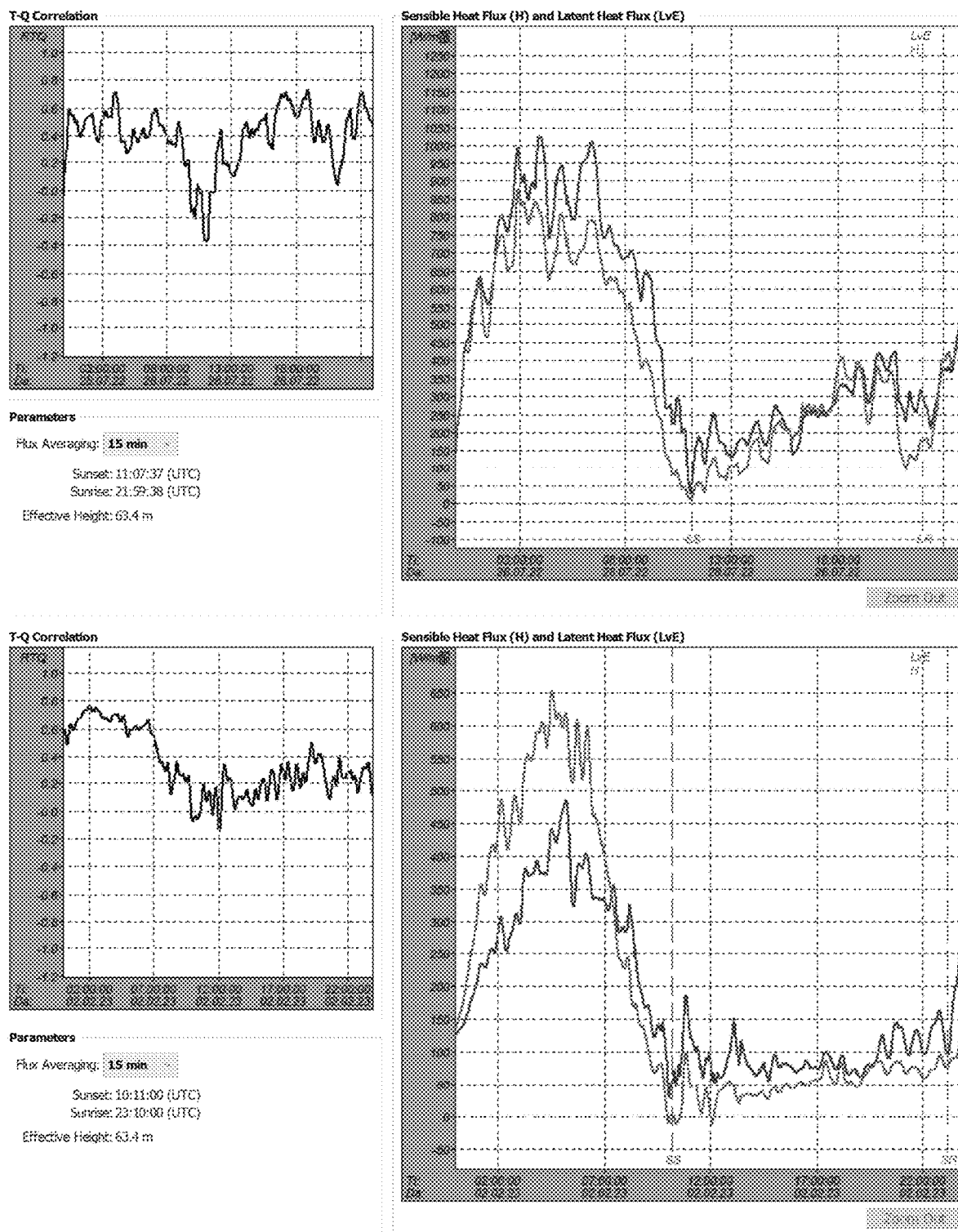
FIG. 5 is a schematic diagram of distribution of flux observation data of a vorticity correlator in summer and winter in the embodiment of the present application.

In the present embodiment, data distribution of the sensible heat flux observation value and the latent heat flux observation value of the vorticity correlator erected on the water body underlying surface in summer (July 28) and winter (February 2) is shown in FIG. 5.

S30: determining a large-aperture scintillometer flux source region according to the large-aperture scintillometer observation data, and calculating temporal-spatial distribution of a sensible heat flux and a latent heat flux of each grid Ain the large-aperture scintillometer flux source region based on the sensible heat flux correction value and the latent heat flux correction value of each underlying surface type and an area ratio of each underlying surface type in combination with the large-aperture scintillometer observation data.

Specifically, the step S30 includes the following steps:

S301: inputting the large-aperture scintillometer observation data into the preset footprint model to obtain the large-aperture scintillometer flux source region corresponding to the selected region.

Specifically, the roughness of the surface in the selected region, a measurement height of the large-aperture scintillometer and the wind speed, the wind direction and the atmospheric stability data in the observation time period are obtained, and the information is input into the footprint model preset in FREddyPro software for calculation to obtain the large-aperture scintillometer flux source region corresponding to the selected region. In the present embodiment, the footprint model is a Kljun model.

S302: based on the sensible heat flux correction value, the latent heat flux correction value and the corresponding area ratio of each underlying surface type, calculating a sensible heat flux ratio coefficient and a latent heat flux ratio coefficient of each grid in the large-aperture scintillometer flux source region at the same moment.

Specifically, the sensible heat flux ratio coefficient and the latent heat flux ratio coefficient are calculated by formulas (15) and (16) respectively:

$$\phi_{j,H\_t} = \frac{f_{j,v\_t}Q_{H,v\_t}+f_{j,w\_t}Q_{H,w\_t}+f_{j,i\_t}Q_{H,i\_t}}{F_{v\_t}Q_{H,v\_t}+F_{w\_t}Q_{H,w\_t}+F_{i\_t}Q_{H,i\_t}} \quad (15)$$

$$\phi_{j,E\_t} = \frac{f_{j,v\_t}Q_{E,v\_t}+f_{j,w\_t}Q_{E,w\_t}+f_{j,i\_t}Q_{E,i\_t}}{F_{v\_t}Q_{E,v\_t}+F_{w\_t}Q_{E,w\_t}+F_{i\_t}Q_{E,i\_t}} \quad (16)$$

where $\phi_{j,H\_t}$ represents a sensible heat flux ratio coefficient of a jth grid at moment t, $\phi_{j,E\_t}$ represents a latent heat flux ratio coefficient of the jth grid at moment t, $f_{j,v\_t}$, $f_{j,w\_t}$ and $f_{j,i\_t}$ are area ratios of the vegetation, water body and impervious underlying surfaces of the jth grid at moment t respectively, $F_{v\_t}$, $F_{w\_t}$ and $F_{i\_t}$ are area ratios of the vegetation, water body and impervious underlying surfaces in the large-aperture scintillometer flux source region at moment t respectively, $Q_{H,v\_t}$, $Q_{H,w\_t}$ and $Q_{H,i\_t}$ are the sensible heat flux correction values of the vegetation, water body and impervious underlying surfaces at moment t respectively, and $Q_{E,v\_t}$, $Q_{E,w\_t}$ and $Q_{E,i\_t}$ are the latent heat flux correction values of the vegetation, water body and impervious underlying surfaces at moment t.

S303: calculating the sensible heat flux and the latent heat flux of each grid in the large-aperture scintillometer flux source region according to the sensible heat flux ratio coefficient, the latent heat flux ratio coefficient as well as a sensible heat flux observation value and a latent heat flux observation value of the large-aperture scintillometer.

Specifically, the sensible heat flux and the latent heat flux are calculated by formulas (17) and (18) respectively:

$$Q_{H,j\_t} = \phi_{j,H\_t}Q_{H,o\_t} \quad (17)$$

$$Q_{E,j\_t} = \phi_{j,E\_t}Q_{E,o\_t} \quad (18)$$

where $Q_{H,j\_t}$ and $Q_{E,j\_t}$ represent a sensible heat flux and a latent heat flux of the jth grid in the large-aperture scintillometer flux source region at moment t respectively, and $Q_{H,o\_t}$ and $Q_{E,o\_t}$ represent a sensible heat flux observation value and a latent heat flux observation value of the large-aperture scintillometer at moment t respectively.

It should be noted that in the present embodiment, the grids in the large-aperture scintillometer flux source region are grids with an area of the flux source region occupying more than 50% of areas of the grids.

S40: calculating temporal-spatial distribution of an anthropogenic heat flux corresponding to each grid according to the temporal-spatial distribution of the sensible heat flux and the latent heat flux of each grid in the large-aperture scintillometer flux source region in combination with the instrument observation data.

Specifically, the step S40 includes the following steps:

S401: calculating a soil heat flux of each grid in the large-aperture scintillometer flux source region according to an area and the average surface temperature of each underlying surface type.

Specifically, an average surface temperature of the selected region is obtained by an unmanned aerial vehicle thermal imager, the soil heat flux of the grid is calculated in combination with the area and heat capacity parameters of each type of underlying surface, and the soil heat flux is calculated by formula (19):

$$Q_{G,j\_t} = \sum_{i=1}^{n}Q_{G,i} = \sum_{i=1}^{n}\frac{1}{A_i}\int_V C_i \frac{dT_s}{dt}dV \quad (19)$$

where $Q_{G,j\_t}$ is a soil heat flux of the jth grid at moment t, i represents an nth underlying surface type of the jth grid, $A_i$ is an area of the ith underlying surface of the jth grid, $C_i$ is heat capacity of the ith underlying surface of the jth grid, $dT_s/dt$ is an average surface temperature change in a given time, and dV is a volume of the underlying surface of the observed region.

S402: calculating a net radiation flux of each grid in the large-aperture scintillometer flux source region according to the area ratio of each underlying surface type and the instrument observation data.

Specifically, radiation data observed by the vorticity correlator is obtained, the net radiation flux of the grid is calculated in combination with the area ratio of each type of underlying surface in the current jth grid and formula (4), and the net radiation flux of the grid is calculated by formula (20):

$$R_{n,j\_t} = f_{v\_t} R_{n,v} + f_{w\_t} R_{n,w} + f_{i\_t} R_{n,i} \quad (20)$$

where $R_{n,j\_t}$ is a net radiation flux of the jth grid at moment t; $R_{n,v}$, $R_{n,w}$ and $R_{n,i}$ are the net radiation fluxes of the underlying surface types calculated according to formula (4) respectively; $f_{v\_t}$, $f_{w\_t}$ and $f_{i\_t}$ are the area ratios of the vegetation, water body and impervious underlying surface types of the jth grid at moment t.

S403: calculating the temporal-spatial distribution of the anthropogenic heat flux of each grid according to the sensible heat flux, the latent heat flux, the soil heat flux and the net radiation flux correspond to each grid in the large-aperture scintillometer flux source region.

Specifically, total heat among the sensible heat flux, the latent heat flux, the soil heat flux and the net radiation flux of the jth grid at moment t is calculated, the anthropogenic heat flux of the jth grid at moment t is calculated in combination with the surface energy balance formula, and the anthropogenic heat flux of the grid is calculated by formula (28):

$$Q_{j,A\_t} = j,H\_t + j,E\_t + G_{j,G\_t} - R_{n,j\_t} \quad (28)$$

where $Q_{j,H\_t}$, $Q_{j,E\_t}$ and $Q_{j,G\_t}$ are the sensible heat flux, the latent heat flux and the soil heat flux of the jth grid at moment t respectively, and $R_{n,j\_t}$ is the net radiation flux of the jth grid at moment t.

S50: dividing input information and the anthropogenic heat fluxes of the grids in the large-aperture scintillometer flux source region into a training set and a verification set according to a certain proportion, constructing an anthropogenic heat flux estimation model using a convolutional neural network algorithm, and estimating temporal-spatial distribution of an anthropogenic heat flux of each grid in the selected region by the anthropogenic heat flux estimation model.

Specifically, the step S50 includes the following steps:

S501: performing data preprocessing on the input information and the anthropogenic heat fluxes of the grids in the large-aperture scintillometer flux source region to form a data set, and dividing the data set into the training set and the verification set according to the ratio of 7:3.

Specifically, the input information includes the average building height, an average vegetation height, the area ratio and the average surface temperature of each underlying surface type, as well as the air temperature, the relative humidity, the long wave radiation, the short wave radiation, the wind speed, the wind direction, the sensible heat flux and the latent heat flux observed by the large-aperture scintillometer; the preprocessing process includes repeatability inspection, data format conversion and normalization.

S502: constructing the anthropogenic heat flux estimation model according to the training set and the verification set based on the convolutional neural network algorithm.

Specifically, an anthropogenic heat flux estimation model framework is constructed based on the convolutional neural network algorithm; in the present invention, a better model hyper-parameter scheme obtained through experiments can be used as initial values of hyper-parameters of the anthropogenic heat flux estimation model: a number of input nodes is 16, a number of output nodes is 1, numbers of convolutional kernels of three two-dimensional convolutional layers are 64, 128 and 256 respectively, a size of each convolutional kernel is 3×3, an activation function is ReLU, a loss function is a mean square error loss function, a gradient descent method is a random gradient descent method, a learning rate is 0.002, and an iteration number is 2,000.

Figure 6:
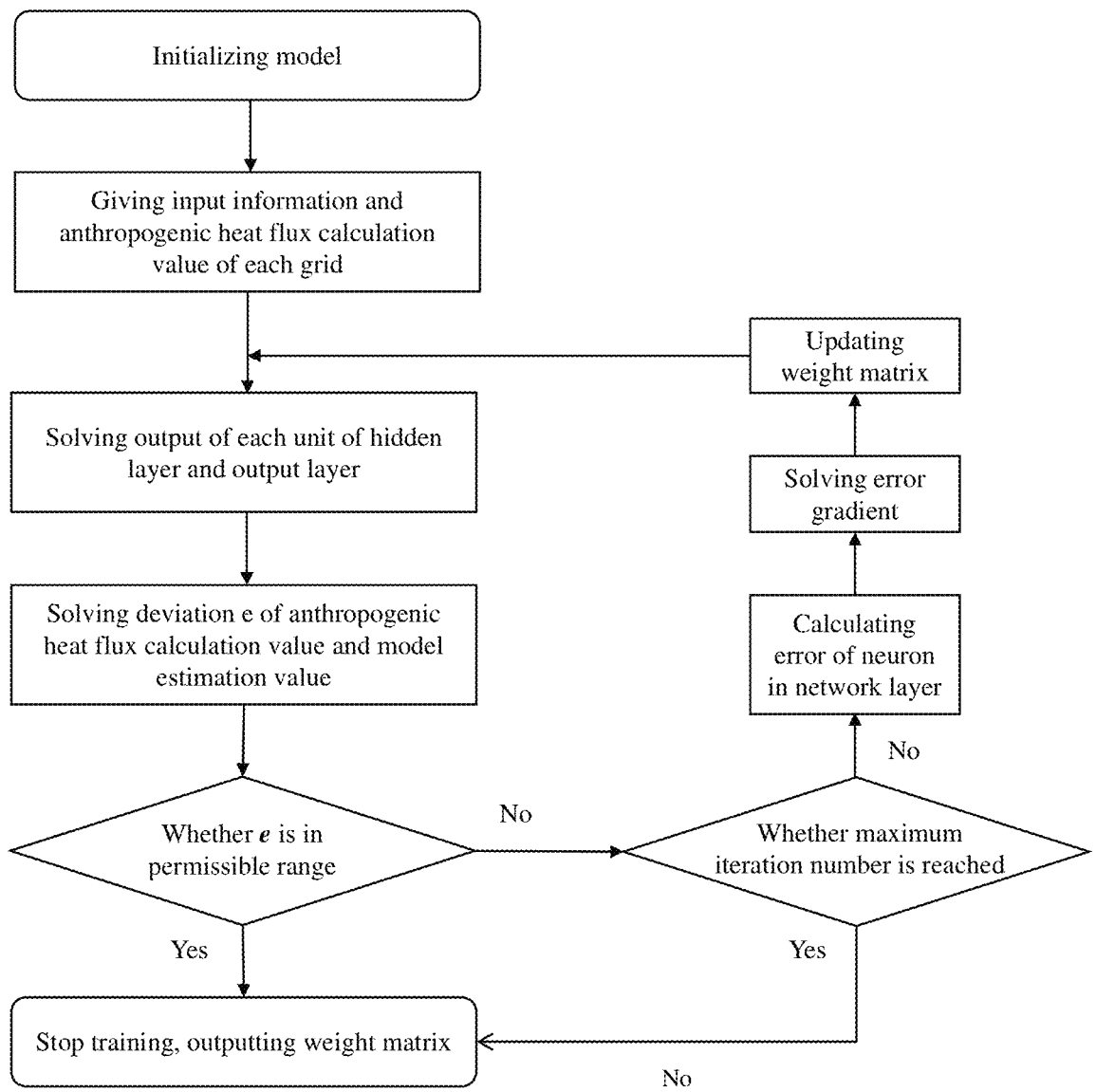
FIG. 6 is a flow chart of training of an anthropogenic heat flux estimation model in the embodiment of the present application.

The anthropogenic heat flux estimation model is trained by inputting the training set, the training process is shown in FIG. 6, the hyper-parameters of the model are adjusted according to an estimation deviation of the model on the verification set, and the steps are repeated until a prediction deviation meets a requirement. In the present embodiment, the estimation deviation is represented by a deviation ratio, and e is set to 10%.

S503: estimating the anthropogenic heat flux of each grid in the selected region by the anthropogenic heat flux estimation model.

Figure 7:
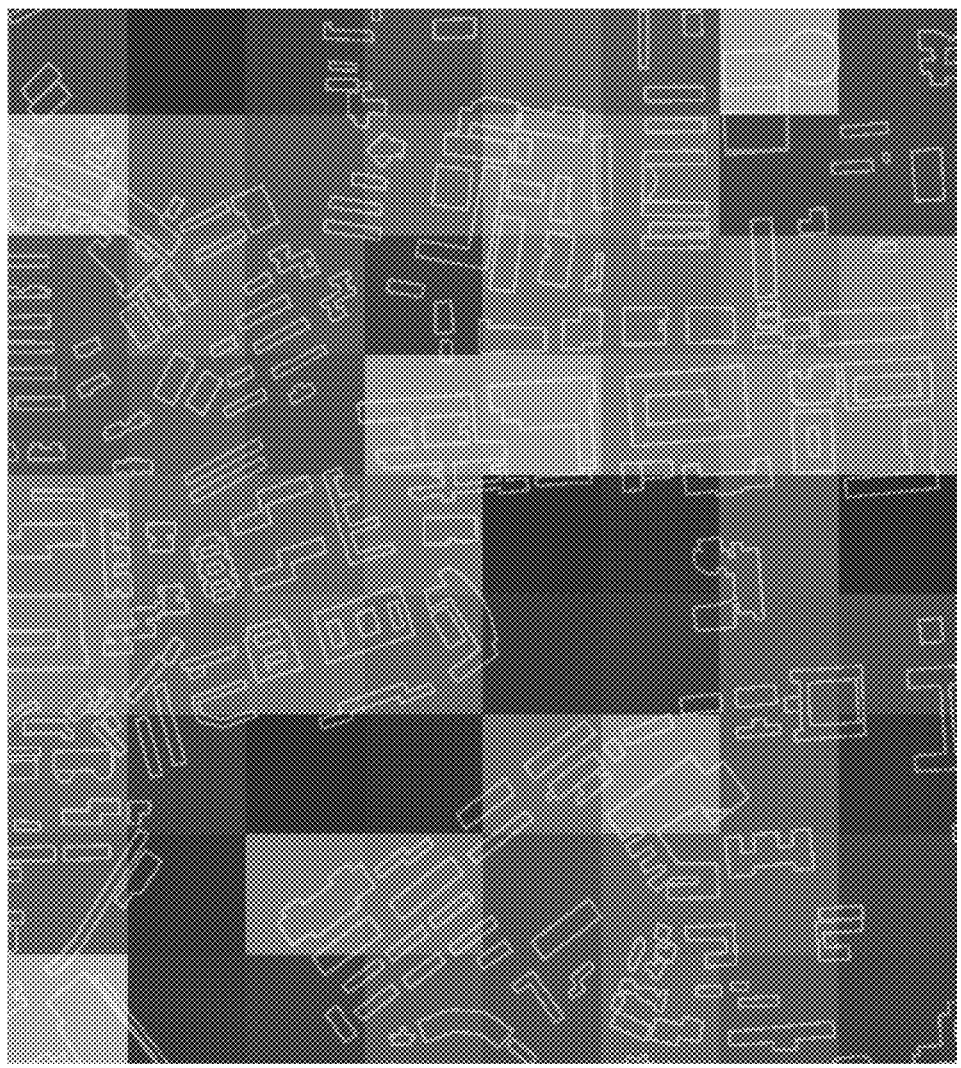
FIG. 7 is a schematic diagram of spatial distribution of an anthropogenic heat flux in the embodiment of the present application.

Specifically, the average building height, the average vegetation height, the area ratio and the average surface temperature of each underlying surface type, as well as the air temperature, the long wave radiation, the short wave radiation, the wind speed, the sensible heat flux and the latent heat flux observed by the large-aperture scintillometer of each grid in the selected region are input through the anthropogenic heat flux estimation model, the anthropogenic heat flux of each grid in the selected region can be output, and distribution of the anthropogenic heat flux of the selected region at a certain moment is shown in FIG. 7.

It should be understood that, the sequence numbers of the steps in the foregoing embodiments do not imply an execution sequence, and the execution sequence of each process should be determined by functions and internal logic of the process, and should not constitute any limitation to the implementation process of the embodiments of the present application.

Figure 2:
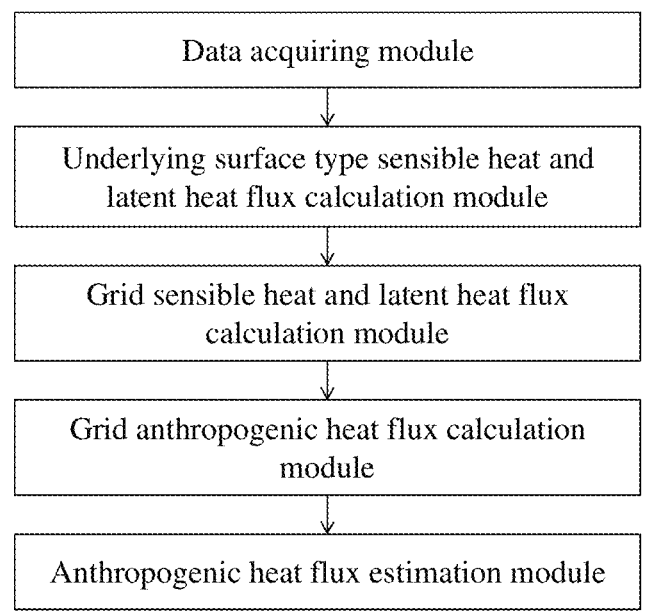
FIG. 2 is a block diagram of an anthropogenic heat flux estimation system based on flux observation data.

In an embodiment, an anthropogenic heat flux estimation system based on flux observation data is provided, which is in one-to-one correspondence to the anthropogenic heat flux estimation method based on flux observation data according to the above embodiment. As shown in FIG. 2, the anthropogenic heat flux estimation system based on flux observation data includes: a data processing module, an underlying surface type sensible heat and latent heat flux calculation module, a grid sensible heat and latent heat flux calculation module, a grid anthropogenic heat flux calculation module and an anthropogenic heat flux estimation module. The functional modules are detailed as follows.

The data processing module is configured to perform grid division on a selected region, and acquire building vector data, land utilization data and instrument observation data in the selected region, the instrument observation data including vorticity correlator observation data, large-aperture scintillometer observation data and unmanned aerial vehicle thermal infrared imager observation data;

the underlying surface type sensible heat and latent heat flux calculation module is configured to determine a vorticity correlator flux source region according to the vorticity correlator observation data, and obtain a sensible heat flux correction value and a latent heat flux correction value of each underlying surface type in the vorticity correlator flux source region in combination with the building vector data, the land utilization data and the instrument observation data;

the grid sensible heat and latent heat flux calculation module is configured to determine a large-aperture scintillometer flux source region according to the large-aperture scintillometer observation data, and calculate temporal-spatial distribution of a sensible heat flux and a latent heat flux of each grid in the large-aperture scintillometer flux source region based on the sensible heat flux correction value and the latent heat flux correction value of each underlying surface type and an area ratio of each underlying surface type in combination with the large-aperture scintillometer observation data;

the grid anthropogenic heat flux calculation module is configured to calculate temporal-spatial distribution of an anthropogenic heat flux corresponding to each grid according to the temporal-spatial distribution of the sensible heat flux and the latent heat flux of each grid in the large-aperture scintillometer flux source region in combination with the instrument observation data; and the anthropogenic heat flux estimation module is configured to divide input information and the anthropogenic heat fluxes of the grids in the large-aperture scintillometer flux source region into a training set and a verification set according to a certain proportion, construct an anthropogenic heat flux estimation model using a convolutional neural network algorithm, and estimate temporal-spatial distribution of an anthropogenic heat flux of each grid in the selected region by the model.

For specific limitations of the anthropogenic heat flux estimation system based on flux observation data, reference may be made to the above limitations of the anthropogenic heat flux estimation method based on flux observation data, which are not repeated herein. All or part of the modules in the above anthropogenic heat flux estimation system based on flux observation data can be implemented through software, hardware and combinations thereof. The modules can be embedded into a processor in a computer device in a hardware form or independent of the processor, or can be stored in a memory in the computer device in a software form, such that the processor can conveniently call the modules to execute operations corresponding to the modules.

It will be understood by those skilled in the art that all or part of the processes of the method according to the embodiments described above may be implemented by a computer program instructing related hardware, the computer program may be stored in a non-volatile computer-readable storage medium, and when executed, the computer program may include the processes of the method according to the embodiments described above. Any reference to memories, storage, databases or other media used in the embodiments of the present application may include non-volatile and/or volatile memories.

It should be clear to those skilled in the art that, for convenience and simplicity of description, the foregoing division of the functional units and modules is only used for illustration, and in practical applications, the above function distribution may be performed by different functional units and modules as needed; that is, the internal structure of the apparatus may be divided into different functional units or modules to perform all or part of the above described functions.

The above embodiments are only used to illustrate the technical solutions of the present application, not to limit the present application; although the present application is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present application and should all be included within the protection scope of the present application.

What is claimed is:

1. An anthropogenic heat flux estimation method based on flux observation data, comprising:

performing grid division on a selected region, and acquiring building vector data, land utilization data and instrument observation data in the selected region, wherein the instrument observation data comprises vorticity correlator observation data, large-aperture scintillometer observation data and unmanned aerial vehicle thermal infrared imager observation data;

determining a vorticity correlator flux source region according to the vorticity correlator observation data, and obtaining a sensible heat flux correction value and a latent heat flux correction value of each underlying surface type in the vorticity correlator flux source region in combination with the building vector data, the land utilization data and the instrument observation data, comprising: inputting the vorticity correlator observation data into a preset footprint model to obtain the vorticity correlator flux source region corresponding to the selected region; calculating a sensible heat flux calculation value of each underlying surface type corresponding to the vorticity correlator flux source region according to the building vector data and the instrument observation data; calculating a latent heat flux calculation value of each underlying surface type corresponding to the vorticity correlator flux source region according to the building vector data and the instrument observation data; and according to the land utilization data and the vorticity correlator observation data, performing data correction on the sensible heat flux calculation value and the latent heat flux calculation value of each underlying surface type corresponding to the vorticity correlator flux source region, so as to obtain the sensible heat flux correction value and the latent heat flux correction value of each underlying surface type;

determining a large-aperture scintillometer flux source region according to the large-aperture scintillometer observation data, and calculating temporal-spatial distribution of a sensible heat flux and a latent heat flux of each grid in the large-aperture scintillometer flux source region based on the sensible heat flux correction value and the latent heat flux correction value of each underlying surface type and an area ratio of each underlying surface type in combination with the large-aperture scintillometer observation data;

calculating temporal-spatial distribution of an anthropogenic heat flux corresponding to each grid according to the temporal-spatial distribution of the sensible heat flux and the latent heat flux of each grid in the large-aperture scintillometer flux source region in combination with the instrument observation data; and dividing input information and anthropogenic heat fluxes of grids in the large-aperture scintillometer flux source region into a training set and a verification set according to a certain proportion, constructing an anthropogenic heat flux estimation model using a convolutional neural network algorithm, and estimating the temporal-spatial distribution of the anthropogenic heat flux of each grid in the selected region by the anthropogenic heat flux estimation model.

2. The anthropogenic heat flux estimation method based on the flux observation data according to claim 1, wherein calculating the sensible heat flux calculation value of each underlying surface type corresponding to the vorticity correlator flux source region according to the building vector data and the instrument observation data comprises:

calculating sensible heat fluxes of a vegetation underlying surface and an impervious underlying surface by formula (1):

$$Q_{H,si} = \frac{\rho c_p (T_{si} - T_a)}{r_a} \quad (1)$$

where $Q_{H,si}$ is a sensible heat flux calculation value of an $i^{th}$ underlying surface type in the vorticity correlator flux source region, p is air density, $c_p$ is constant-pressure specific heat, $T_{si}$ is an average surface temperature of the ith underlying surface type, $T_a$ is an air temperature, $r_a$ is aerodynamic impedance, $r_a$ is constant in a same region, and $r_a$ is calculated by formula (2):

$$r_a = \frac{\ln\left(\frac{z_m - d}{z_{0m}}\right)\ln\left(\frac{z_h - d}{z_{0m}}\right)}{k^2 u_z} \quad (2)$$

where $z_m$ is a wind speed measurement height, $z_h$ is an air temperature measurement height, d is a zero plane displacement height, $z_{0m}$ is momentum roughness, $z_{0h}$ is heat roughness, $z_{0h}=0.1 z_{0m}$, k is a Von Karman constant, $u_z$ is a wind speed, and d and $z_{0m}$ comprehensively consider an average building height $H_b$ and vegetation height $H_v$ of the vorticity correlator flux source region; and calculating a sensible heat flux of a water body underlying surface by formula (3):

$$Q_{H,sw} = 0.47(9.2 + 0.46 u_z^2)(T_{sw} - T_a) \quad (3)$$

where $Q_{H,sw}$ is a sensible heat flux calculation value of the water body underlying surface in the vorticity correlator flux source region, and $T_{sw}$ is an average surface temperature of the water body underlying surface.

3. The anthropogenic heat flux estimation method based on the flux observation data according to claim 2, wherein calculating the latent heat flux calculation value of each underlying surface type corresponding to the vorticity correlator flux source region according to the building vector data and the instrument observation data comprises:

calculating a net radiation flux received by a surface of each underlying surface type by formula (4):

$$R_n = (1-\alpha_i) SW_{in} - \sigma \varepsilon_i T_{si}^4 + \varepsilon_i LW_{in} \quad (4)$$

where $R_n$ is the net radiation flux received by the surface of each underlying surface type, $S_{Win}$ and $L_{Win}$ are solar short wave radiation and atmospheric long wave radiation respectively, $\alpha_i$ is a surface albedo of each underlying surface type, $\sigma$ is a Stefan-Boltzmann constant, and $\varepsilon_i$ is a surface emissivity of each underlying surface type;

calculating a latent heat flux of the vegetation underlying surface by formula (5):

$$Q_{E,sv} = \frac{\Delta R_{n,v} + \rho c_p \frac{e_s - e_a}{r_a}}{\Delta + \gamma\left(1 + \frac{r_{s,v}}{r_a}\right)} \quad (5)$$

where $Q_{E,sv}$ is a latent heat flux calculation value of the vegetation underlying surface in the vorticity correlator flux source region, $\Delta$ is a slope of a saturated water vapor pressure curve, $R_{n,v}$ is a net radiation flux received by a vegetation surface, $e_s$ is a saturated water vapor pressure calculated according to an average surface temperature of a corresponding underlying surface, $e_a$ is an actual water vapor pressure, $\gamma$ is a psychrometer constant, and $r_{s,v}$ is vegetation surface water vapor diffusion impedance calculated by formula (6):

$$r_{s,v} = \frac{1}{C_L m(T_{min}) m(VPD) LAI} \quad (6)$$

where $C_L$ is average potential stomatal conductance per unit leaf area, $m(T_{min})$ represents an air temperature stress function, $m(VPD)$ represents a water vapor pressure stress function, and LAI is a leaf area index;

calculating a latent heat flux of the water body underlying surface by formula (7):

$$Q_{E,sw} = \frac{\Delta R_{n,w} + \gamma f(u)(e_s - e_a)}{\Delta + \gamma} \quad (7)$$

where $Q_{E,sw}$ is a latent heat flux calculation value of the water body underlying surface in the vorticity correlator flux source region, $R_{n,w}$ is a net radiation flux received by a water body surface, a wind function is $f(u)=(2.33+1.65\ u)L^{-0.1}$, $L=0.5(A_w \pi)^{0.5}$, and $A_w$ is a water body area; and calculating a latent heat flux of the impervious underlying surface by formula (8):

$$Q_{E,si} = \frac{\Delta R_{n,i} + \rho c_p \frac{e_s - e_a}{r_a}}{\Delta + \gamma\left(1 + \frac{r_{s,i}}{r_a}\right)} \quad (8)$$

where $Q_{E,si}$ is a latent heat flux calculation value of the impervious underlying surface in the vorticity correlator flux source region, $R_{n,i}$ is a net radiation flux received by an impervious surface, $r_{s,i}$ is impervious surface water vapor diffusion impedance, $r_{s,i}=\exp(8.206-4.225\ W)$, and W is a wetting degree of the impervious surface.

4. The anthropogenic heat flux estimation method based on the flux observation data according to claim 1, wherein performing the data correction on the sensible heat flux calculation value and the latent heat flux calculation value of each underlying surface type corresponding to the vorticity correlator flux source region according to the land utilization data and the vorticity correlator observation data so as to obtain the sensible heat flux correction value and the latent heat flux correction value of each underlying surface type comprises:

obtaining the sensible heat flux calculation value and a sensible heat flux observation value of a vorticity correlator of each underlying surface type at a same moment, correcting the sensible heat flux calculation value according to the area ratio and the sensible heat flux observation value of each underlying surface type, and taking an average value obtained using a slip averaging method as the sensible heat flux correction value of each underlying surface type at the same moment, sensible heat flux correction values corresponding to vegetation, water body and impervious underlying surfaces being calculated using formulas (9) to (11) respectively:

$$Q_{H,v\_t} = \frac{1}{n}\sum_{\tau=1}^{n}\left(\frac{f_{v\_\tau}Q_{H,sv\_\tau}}{f_{v\_\tau}Q_{H,sv\_\tau}+f_{w\_\tau}Q_{H,sw\_\tau}+f_{i\_\tau}Q_{H,si\_\tau}}\right)Q_{H,so\_t} \quad (9)$$

$$Q_{H,w\_t} = \frac{1}{n}\sum_{\tau=1}^{n}\left(\frac{f_{w\_\tau}Q_{H,sw\_\tau}}{f_{v\_\tau}Q_{H,sv\_\tau}+f_{w\_\tau}Q_{H,sw\_\tau}+f_{i\_\tau}Q_{H,si\_\tau}}\right)Q_{H,so\_t} \quad (10)$$

$$Q_{H,i\_t} = \frac{1}{n}\sum_{\tau=1}^{n}\left(\frac{f_{i\_\tau}Q_{H,si\_\tau}}{f_{v\_\tau}Q_{H,sv\_\tau}+f_{w\_\tau}Q_{H,sw\_\tau}+f_{i\_\tau}Q_{H,si\_\tau}}\right)Q_{H,so\_t} \quad (11)$$

where n represents an observation time window required for slip averaging calculation, $Q_{H,v\_t}$, $Q_{H,w\_t}$ and $Q_{H,i\_t}$ are the sensible heat flux correction values corresponding to the vegetation, the water body and the impervious underlying surfaces at moment t respectively, $Q_{H,sv\_\tau}$, $Q_{H,sw\_\tau}$ and $Q_{H,si\_\tau}$ are sensible heat flux calculation values corresponding to the vegetation, the water body and the impervious underlying surfaces at the moment t of day τ respectively, $f_{v\_\tau}$, $f_{w\_\tau}$ and $f_{i\_\tau}$ are area ratios of the vegetation, the water body and the impervious underlying surfaces in the vorticity correlator flux source region at the moment t of the day τ respectively, and $Q_{H,so\_t}$ is the sensible heat flux observation value of the vorticity correlator at the moment t of the day τ; and obtaining the latent heat flux calculation value and a latent heat flux observation value of the vorticity correlator of each underlying surface type at the same moment, correcting the latent heat flux calculation value according to the area ratio and the latent heat flux observation value of each underlying surface type, and taking an average value obtained using the slip averaging method as the latent heat flux correction value of each underlying surface type at the same moment, latent heat flux correction values corresponding to the vegetation, the water body and the impervious underlying surfaces being calculated using formulas (12) to (14) respectively:

$$Q_{E,v\_t} = \frac{1}{n}\sum_{\tau=1}^{n}\left(\frac{f_{v\_\tau}Q_{E,sv\_\tau}}{f_{v\_\tau}Q_{E,sv\_\tau}+f_{w\_\tau}Q_{E,sw\_\tau}+f_{i\_\tau}Q_{E,si\_\tau}}\right)Q_{E,so\_t} \quad (12)$$

$$Q_{E,w\_t} = \frac{1}{n}\sum_{\tau=1}^{n}\left(\frac{f_{w\_\tau}Q_{E,sw\_\tau}}{f_{v\_\tau}Q_{E,sv\_\tau}+f_{w\_\tau}Q_{E,sw\_\tau}+f_{i\_\tau}Q_{E,si\_\tau}}\right)Q_{E,so\_t} \quad (13)$$

$$Q_{E,i\_t} = \frac{1}{n}\sum_{\tau=1}^{n}\left(\frac{f_{i\_\tau}Q_{E,si\_\tau}}{f_{v\_\tau}Q_{E,sv\_\tau}+f_{w\_\tau}Q_{E,sw\_\tau}+f_{i\_\tau}Q_{E,si\_\tau}}\right)Q_{E,so\_t} \quad (14)$$

where $Q_{E,v\_t}$, $Q_{E,w\_t}$ and $Q_{E,i\_t}$ are the latent heat flux correction values corresponding to the vegetation, the water body and the impervious underlying surfaces at the moment t respectively, $Q_{E,sv\_\tau}$, $Q_{E,sw\_\tau}$ and $Q_{E,si\_\tau}$ are latent heat flux calculation values corresponding to the vegetation, the water body and the impervious underlying surfaces at the moment t of the day τ respectively, and $Q_{E,so\_t}$ is the latent heat flux observation value of the vorticity correlator at the moment t of the day τ.

5. The anthropogenic heat flux estimation method based on the flux observation data according to claim 1, wherein determining the large-aperture scintillometer flux source region according to the large-aperture scintillometer observation data, and calculating the temporal-spatial distribution of the sensible heat flux and the latent heat flux of each grid in the large-aperture scintillometer flux source region based on the sensible heat flux correction value and the latent heat flux correction value of each underlying surface type and the area ratio of each underlying surface type in combination with the large-aperture scintillometer observation data comprises:

inputting the large-aperture scintillometer observation data into the preset footprint model to obtain the large-aperture scintillometer flux source region corresponding to the selected region;

based on the sensible heat flux correction value, the latent heat flux correction value and a corresponding area ratio of each underlying surface type, calculating a sensible heat flux ratio coefficient and a latent heat flux ratio coefficient of each grid in the large-aperture scintillometer flux source region at a same moment, the sensible heat flux ratio coefficient and the latent heat flux ratio coefficient being calculated by formulas (15) and (16) respectively:

$$\varphi_{j,H\_t} = \frac{f_{j,v\_t}Q_{H,v\_t}+f_{j,w\_t}Q_{H,w\_t}+f_{j,i\_t}Q_{H,i\_t}}{F_{v\_t}Q_{H,v\_t}+F_{w\_t}Q_{H,w\_t}+F_{i\_t}Q_{H,i\_t}} \quad (15)$$

$$\varphi_{j,E\_t} = \frac{f_{j,v\_t}Q_{E,v\_t}+f_{j,w\_t}Q_{E,w\_t}+f_{j,i\_t}Q_{E,i\_t}}{F_{v\_t}Q_{E,v\_t}+F_{w\_t}Q_{E,w\_t}+F_{i\_t}Q_{E,i\_t}} \quad (16)$$

where $\varphi_{j,H\_t}$ represents a sensible heat flux ratio coefficient of a jth grid at moment t, $\varphi_{j,E\_t}$ represents a latent heat flux ratio coefficient of the jth grid at the moment t, $f_{j,v\_t}$, $f_{j,w\_t}$ and $f_{j,i\_t}$ are area ratios of vegetation, water body and impervious underlying surfaces of the jth grid at the moment t respectively, $F_{v\_t}$, $F_{w\_t}$ and $F_{i\_t}$ are area ratios of the vegetation, the water body and the impervious underlying surfaces in the large-aperture scintillometer flux source region at the moment t respectively, $Q_{H,v\_t}$, $Q_{H,w\_t}$ and $Q_{H,i\_t}$ are sensible heat flux correction values of the vegetation, the water body and the impervious underlying surfaces at the moment t respectively, and $Q_{E,v\_t}$, $Q_{E,w\_t}$ and $Q_{E,i\_t}$ are latent heat flux correction values of the vegetation, the water body and the impervious underlying surfaces at the moment t; and calculating the sensible heat flux and the latent heat flux of each grid in the large-aperture scintillometer flux source region according to the sensible heat flux ratio coefficient, the latent heat flux ratio coefficient as well as a sensible heat flux observation value and a latent heat flux observation value of a large-aperture scintillometer, the sensible heat flux and the latent heat flux being calculated by formulas (17) and (18) respectively:

$$Q_{H,j\_t} = \varphi_{j,H\_t} Q_{H,o\_t} \quad (17)$$

$$Q_{E,j\_t} = \varphi_{j,E\_t} Q_{E,o\_t} \quad (18)$$

where $Q_{H,j\_t}$ and $Q_{E,j\_t}$ represent a sensible heat flux and a latent heat flux of the jth grid in the large-aperture scintillometer flux source region at the moment t respectively, and $Q_{H,o\_t}$ and $Q_{E,o\_t}$ represent a sensible heat flux observation value and a latent heat flux observation value of the large-aperture scintillometer at the moment t respectively.

6. The anthropogenic heat flux estimation method based on the flux observation data according to claim 1, wherein calculating the temporal-spatial distribution of the anthropogenic heat flux corresponding to each grid according to the temporal-spatial distribution of the sensible heat flux and the latent heat flux of each grid in the large-aperture scintillometer flux source region in combination with the instrument observation data comprises:
   calculating a soil heat flux of each grid in the large-aperture scintillometer flux source region according to an area and an average surface temperature of each underlying surface type, the soil heat flux being calculated by formula (19):

$$Q_{G,j\_t} = \sum_{i=1}^{n} Q_{G,i} = \sum_{i=1}^{n} \frac{1}{A_i} \int_V C_i \frac{dT_s}{dt} dV \quad (19)$$

where $Q_{G,j\_t}$ is a soil heat flux of a jth grid at moment t, i represents an nth underlying surface type of the jth grid, $A_i$ is an area of an ith underlying surface of the jth grid, $C_i$ is heat capacity of the ith underlying surface of the jth grid, $dT_s/dt$ is an average surface temperature change in a given time, and dV is a volume of the underlying surface of an observed region;

calculating a net radiation flux of each grid according to the area ratio of each underlying surface type in each grid in the large-aperture scintillometer flux source region and the vorticity correlator observation data, the net radiation flux being calculated by formula (20);

$$R_{n,j\_t} = f_{v\_t} R_{n,v} + f_{w\_t} R_{n,w} + f_{i\_t} R_{n,i} \quad (20)$$

where $R_{n,j\_t}$ is a net radiation flux of the jth grid at the moment t, $R_{n,v}$, $R_{n,w}$ and $R_{n,i}$ are net radiation fluxes of the underlying surface types calculated according to formula (4) respectively:

$$R_n = (1-\alpha) SW_{in} - \sigma \varepsilon_i T_{si}^4 + \varepsilon_i LW_{in} \quad (4)$$

where $R_n$ is a net radiation flux received by a surface of each underlying surface type, $S_{Win}$ and $L_{Win}$ are solar short wave radiation and atmospheric long wave radiation respectively, $\alpha_i$ is a surface albedo of each underlying surface type, $\sigma$ is a Stefan-Boltzmann constant, and $\varepsilon_i$ is a surface emissivity of each underlying surface type;

where $f_{v\_t}$, $f_{w\_t}$ and $f_{i\_t}$ are area ratios of vegetation, water body and impervious underlying surface types of the jth grid at the moment t; and calculating the temporal-spatial distribution of the anthropogenic heat flux of each grid according to the sensible heat flux, the latent heat flux, the soil heat flux and the net radiation flux correspond to each grid in the large-aperture scintillometer flux source region.

7. The anthropogenic heat flux estimation method based on the flux observation data according to claim 1, wherein dividing the input information and the anthropogenic heat fluxes of the grids in the large-aperture scintillometer flux source region into the training set and the verification set according to the certain proportion, constructing the anthropogenic heat flux estimation model using the convolutional neural network algorithm, and estimating the temporal-spatial distribution of the anthropogenic heat flux of each grid in the selected region by the anthropogenic heat flux estimation model comprises:
   dividing the input information and the anthropogenic heat flux of each grid in the large-aperture scintillometer flux source region into the training set and the verification set according to the certain proportion, the input information comprising an average building height, an average vegetation height, the area ratio and a corresponding average surface temperature of each underlying surface type, as well as an air temperature, long wave radiation, short wave radiation, a wind speed, the sensible heat flux and the latent heat flux observed by a large-aperture scintillometer;
   constructing the anthropogenic heat flux estimation model according to the training set and the verification set based on the convolutional neural network algorithm; and
   inputting the input information of each grid in the selected region through the anthropogenic heat flux estimation model, and outputting the temporal-spatial distribution of the anthropogenic heat fluxes of all the grids in the selected region.

8. An anthropogenic heat flux estimation system based on flux observation data, comprising:
   a data processing module configured to perform grid division on a selected region, and acquire building vector data, land utilization data and instrument observation data in the selected region, the instrument observation data comprising vorticity correlator observation data, large-aperture scintillometer observation data and unmanned aerial vehicle thermal infrared imager observation data;
   an underlying surface type sensible heat and latent heat flux calculation module configured to determine a vorticity correlator flux source region according to the vorticity correlator observation data, and obtain a sensible heat flux correction value and a latent heat flux correction value of each underlying surface type in the vorticity correlator flux source region in combination with the building vector data, the land utilization data and the instrument observation data, which specifically comprises: inputting the vorticity correlator observation data into a preset footprint model to obtain the vorticity correlator flux source region corresponding to the selected region; calculating a sensible heat flux calculation value of each underlying surface type corresponding to the vorticity correlator flux source region according to the building vector data and the instrument observation data; calculating a latent heat flux calculation value of each underlying surface type corresponding to the vorticity correlator flux source region according to the building vector data and the instrument observation data; and
   according to the land utilization data and the vorticity correlator observation data, performing data correction on the sensible heat flux calculation value and the latent heat flux calculation value of each underlying surface type corresponding to the vorticity correlator flux source region, so as to obtain the sensible heat flux correction value and the latent heat flux correction value of each underlying surface type;

a grid sensible heat and latent heat flux calculation module configured to determine a large-aperture scintillometer flux source region according to the large-aperture scintillometer observation data, and calculate temporal-spatial distribution of a sensible heat flux and a latent heat flux of each grid in the large-aperture scintillometer flux source region based on the sensible heat flux correction value and the latent heat flux correction value of each underlying surface type and an area ratio of each underlying surface type in combination with the large-aperture scintillometer observation data;

a grid anthropogenic heat flux calculation module configured to calculate temporal-spatial distribution of an anthropogenic heat flux corresponding to each grid according to the temporal-spatial distribution of the sensible heat flux and the latent heat flux of each grid in the large-aperture scintillometer flux source region in combination with the instrument observation data; and an anthropogenic heat flux estimation module configured to divide input information and anthropogenic heat fluxes of grids in the large-aperture scintillometer flux source region into a training set and a verification set according to a certain proportion, construct an anthropogenic heat flux estimation model using a convolutional neural network algorithm, and estimate the temporal-spatial distribution of the anthropogenic heat flux of each grid in the selected region by the anthropogenic heat flux estimation model.

* * * * *